United States Patent
Ware

(10) Patent No.: US 9,383,527 B2
(45) Date of Patent: Jul. 5, 2016

(54) OPTICAL CONNECTOR SUITABLE FOR FIELD ASSEMBLY

(71) Applicant: Rolling River, LLC, Franklin, TN (US)

(72) Inventor: Brent Ware, Franklin, TN (US)

(73) Assignee: Rolling River, LLC, Franklin, TN (US)

( * ) Notice: Subject to any disclaimer, the term of this patent is extended or adjusted under 35 U.S.C. 154(b) by 0 days.

(21) Appl. No.: 14/458,992

(22) Filed: Aug. 13, 2014

(65) Prior Publication Data

US 2016/0047995 A1 Feb. 18, 2016

(51) Int. Cl.
*G02B 6/38* (2006.01)
*G02B 6/46* (2006.01)

(52) U.S. Cl.
CPC ............ *G02B 6/3898* (2013.01); *G02B 6/3881* (2013.01); *G02B 6/3882* (2013.01); *G02B 6/46* (2013.01)

(58) Field of Classification Search
CPC .. G02B 6/3898; G02B 6/3881; G02B 6/3882; G02B 6/42
USPC ...................................... 385/53–94, 134–139
See application file for complete search history.

(56) References Cited

U.S. PATENT DOCUMENTS

| | | | | |
|---|---|---|---|---|
| 4,793,683 A * | 12/1988 | Cannon, Jr. | .......... | G02B 6/3821 385/60 |
| 5,073,042 A * | 12/1991 | Mulholland | ......... | G02B 6/3825 385/56 |
| 7,201,518 B2 * | 4/2007 | Holmquist | ........... | G02B 6/3869 385/53 |
| 7,241,056 B1 * | 7/2007 | Kuffel | .................. | G02B 6/3806 385/60 |
| 7,412,145 B2 * | 8/2008 | Honma | ................. | G02B 6/3802 385/134 |
| 8,158,073 B2 * | 4/2012 | Maleta | .................... | B01D 3/163 261/108 |
| 8,439,577 B2 | 5/2013 | Jenkins | | |
| 8,442,375 B2 * | 5/2013 | Bylander | ............. | G02B 6/3833 385/134 |
| 8,480,314 B2 * | 7/2013 | Saito | .................... | G02B 6/3862 385/95 |
| 8,721,192 B2 * | 5/2014 | Miyadera | ................. | G02B 6/30 385/14 |
| 2003/0103733 A1 * | 6/2003 | Fleenor | ............... | G02B 6/3851 385/78 |
| 2003/0161586 A1 * | 8/2003 | Hirabayashi | ......... | G02B 6/3869 385/78 |
| 2005/0244108 A1 * | 11/2005 | Billman | ............... | G02B 6/3846 385/60 |
| 2006/0153515 A1 * | 7/2006 | Honma | ................ | G02B 6/3802 385/134 |
| 2008/0011990 A1 | 1/2008 | Kostet et al. | | |
| 2008/0013907 A1 | 1/2008 | Zumovitch et al. | | |
| 2008/0013909 A1 | 1/2008 | Kostet et al. | | |
| 2008/0013956 A1 | 1/2008 | Ware et al. | | |
| 2008/0013957 A1 | 1/2008 | Akers et al. | | |
| 2008/0175540 A1 | 7/2008 | Zheng et al. | | |
| 2008/0175545 A1 | 7/2008 | Zheng et al. | | |
| 2010/0215321 A1 | 8/2010 | Jenkins | | |
| 2010/0310214 A1 * | 12/2010 | Miyadera | ............. | G02B 6/3636 385/91 |
| 2010/0316344 A1 * | 12/2010 | Bylander | ............. | G02B 6/3833 385/134 |
| 2011/0079930 A1 * | 4/2011 | Saito | .................... | G02B 6/3862 264/1.25 |
| 2014/0286611 A1 * | 9/2014 | Pratt | .................... | G02B 6/3887 385/78 |

\* cited by examiner

*Primary Examiner* — Ryan Lepisto
*Assistant Examiner* — Guy Anderson
(74) *Attorney, Agent, or Firm* — Banner & Witcoff, Ltd.

(57) ABSTRACT

A field assembly kit for use in assembling an optical connector may include a first component that includes a first plurality of pairs of opposing tabs configured to frictionally maintain a first subassembly component at a first fixed position relative to the first component. The kit may include a second component that includes a second plurality of pairs of opposing tabs configured to maintain a second subassembly component at a second fixed position relative to the first component. The first subassembly component may be configured to couple to the second subassembly component to maintain an optical fiber in a fixed rotational position relative to the first subassembly component and the second subassembly component.

20 Claims, 15 Drawing Sheets

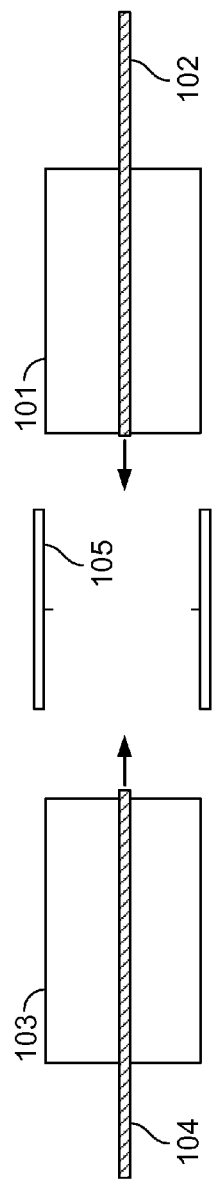
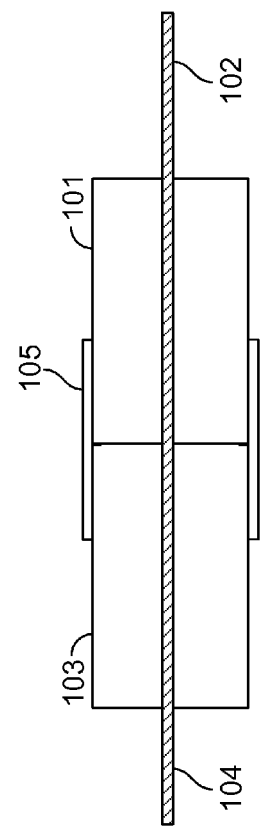

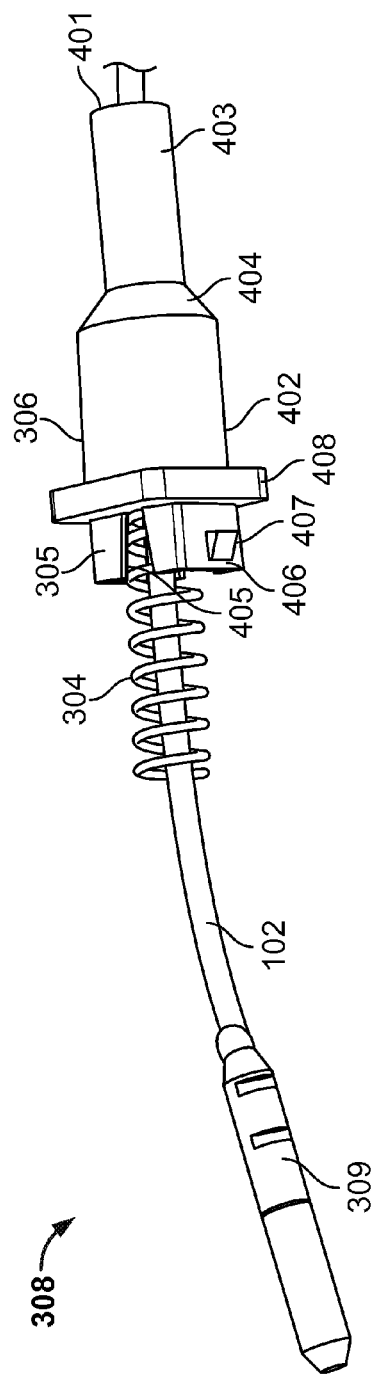
FIG. 4
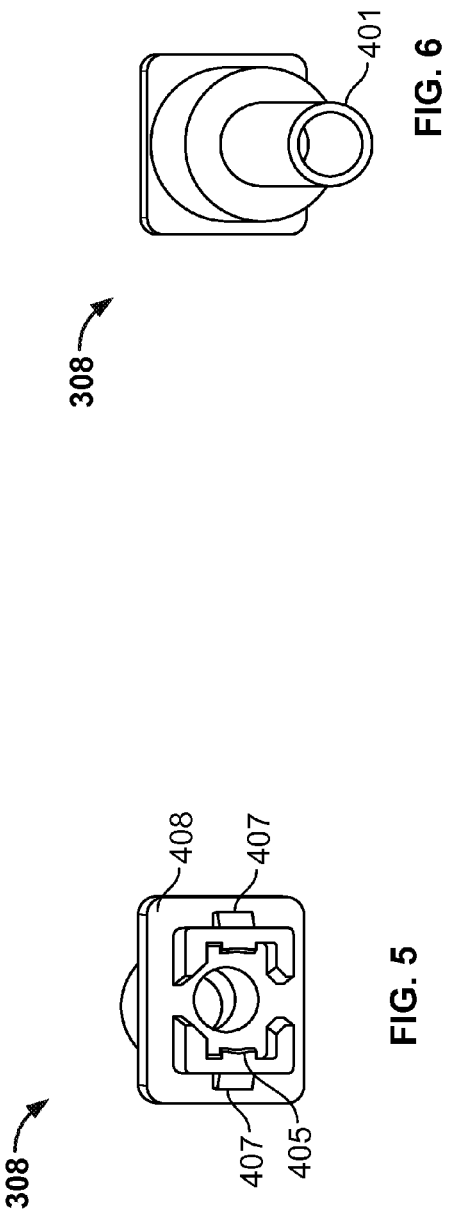
FIG. 6
FIG. 5

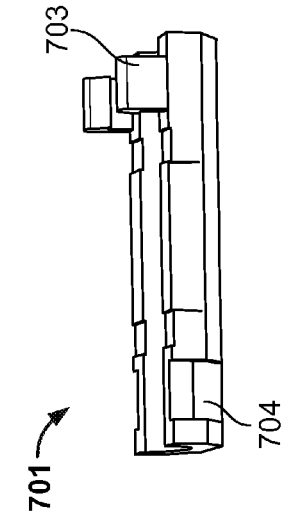
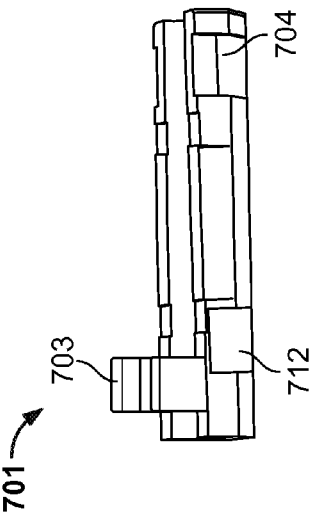
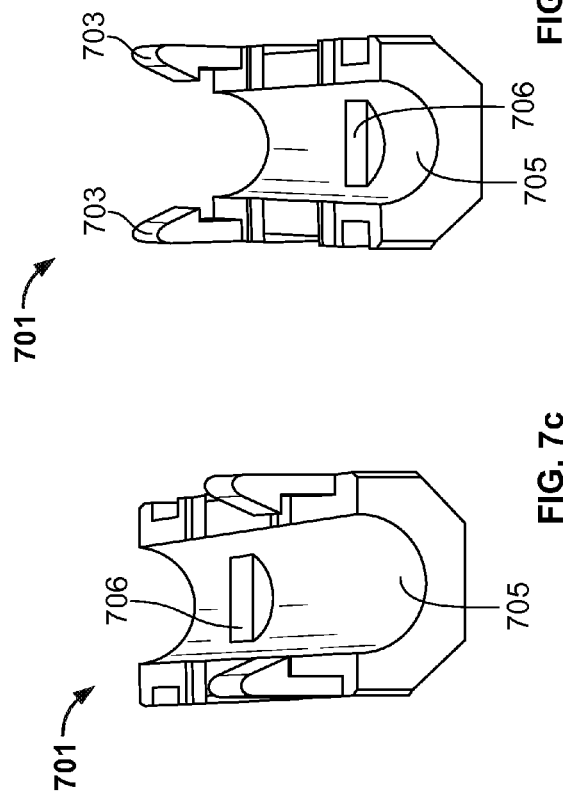
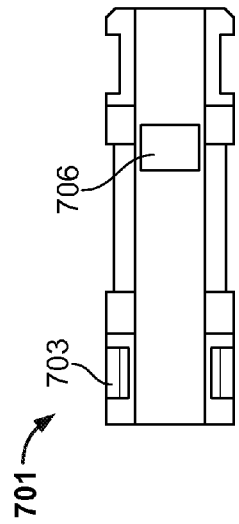
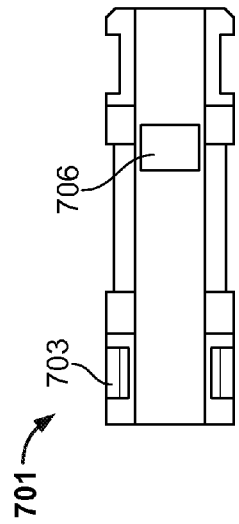

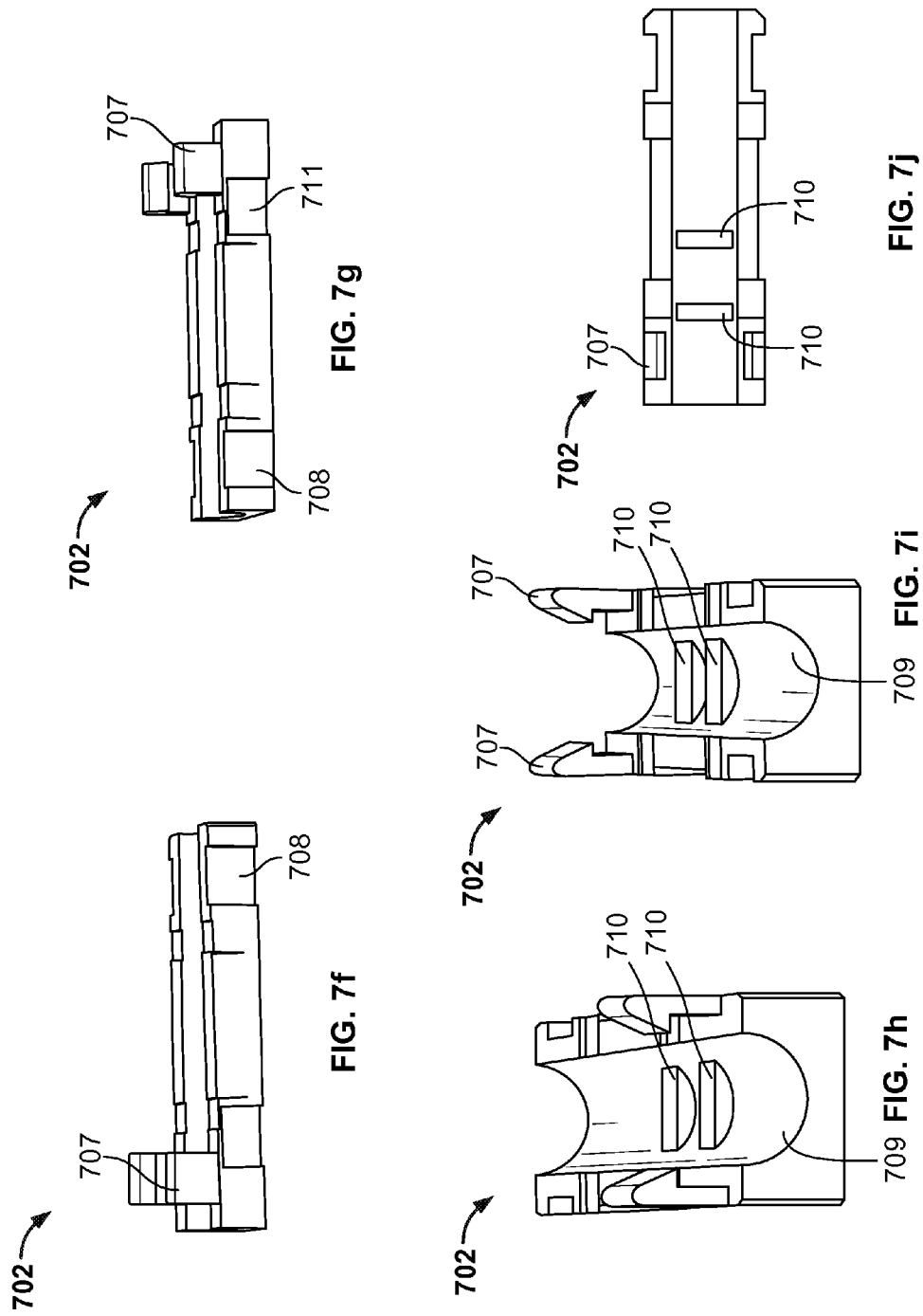

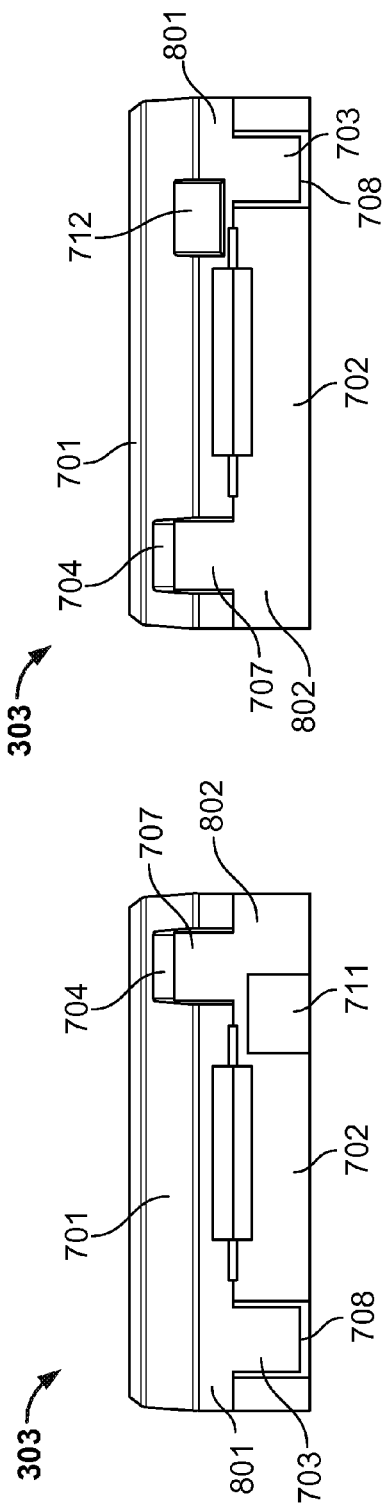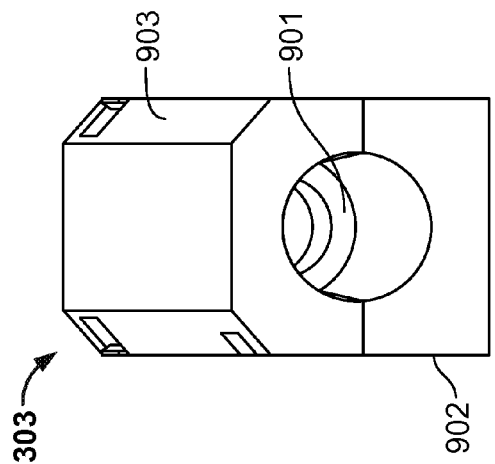

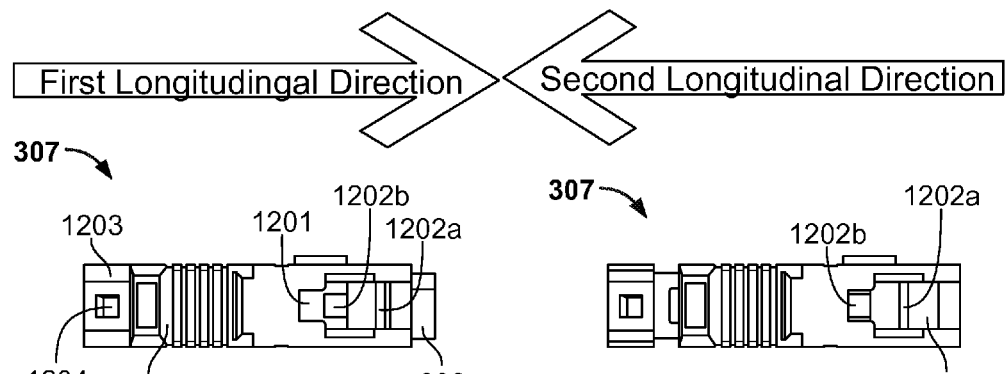
FIG. 12
FIG. 13
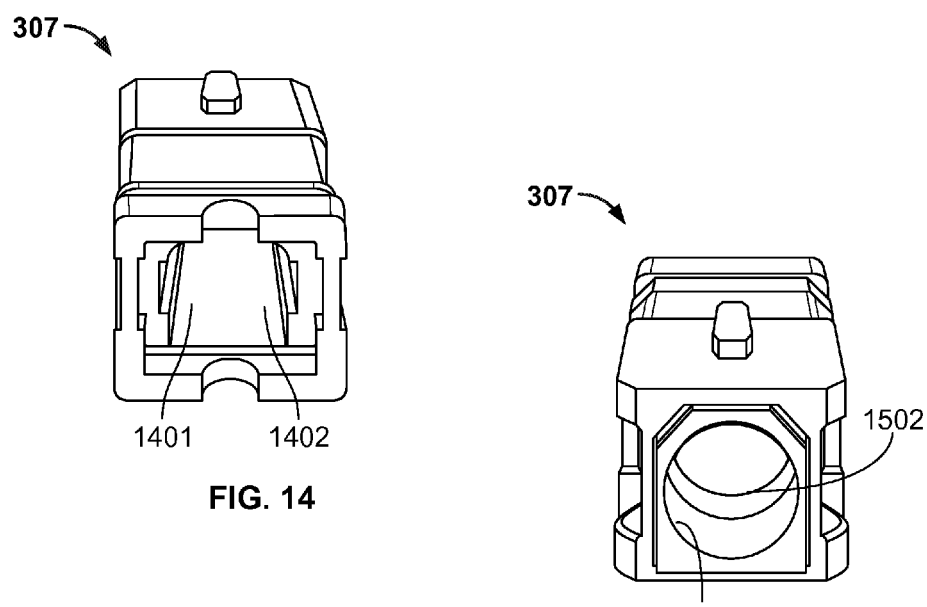
FIG. 14
FIG. 15

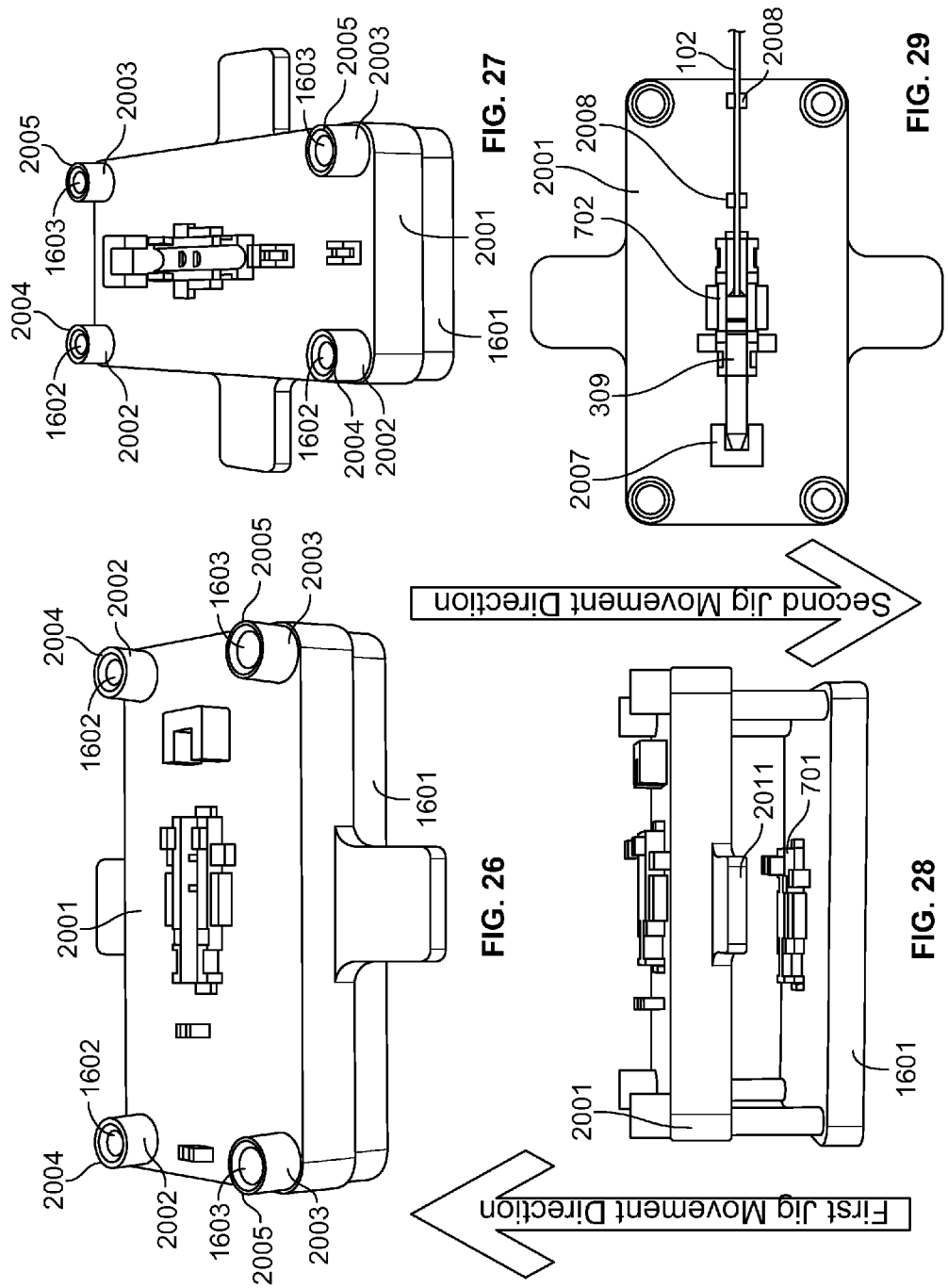

First Jig Movement Direction

Second Jig Movement Direction

OPTICAL CONNECTOR SUITABLE FOR FIELD ASSEMBLY

BACKGROUND

Optical connectors are well known and are available in a variety of configurations. For example, a popular type of optical connector is the SC-type of connector. Other common types of optical connectors are the LC, ST, and FC types. However, most optical connectors require sophisticated equipment to properly and accurately assemble the connectors. Moreover, where optical fiber tips are often angled to reduce reflection at the connection point, rotational alignment is an additional factor that makes the assembling of optical connectors a difficult, delicate, and time-consuming process. Because of this, nearly all optical connectors are pre-assembled at the manufacturer's factory and include a short optical fiber pigtail. The consumer, upon receiving the pre-manufactured connector with pigtail, splices the pigtail to the consumer's own optical fiber, such as by fusion splicing.

There have been several problems with this connectorized pigtail approach. For example, proper splicing of optical fibers requires training and extensive practice. Even after proper training, the splicing process itself is slow, which becomes especially important where a large number of connectors need to be added to an optical system. Additionally, a splice inevitably adds some degree of signal loss, and so with every connector there exists at least two sources of signal loss—at the connector and at the splice. Even with proper training by the person creating the splice, splices (especially mechanical splices, which use an index matching gel that degrades after only a year or two) have proven to be unreliable. Still another problem is that the equipment for creating a relatively good quality splice (i.e., the splicer) is expensive. This expense is magnified where multiple workers operate simultaneously such that each worker requires his or her own splicer.

SUMMARY

In view of the above, an improved optical connector and process for making an optical connection is needed.

The following presents a simplified summary of illustrative aspects in order to provide a basic understanding of various aspects described herein. This summary is not an extensive overview of the invention. It is not intended to identify key or critical elements of the invention or to delineate the scope of the invention. The following summary merely presents various concepts in a simplified form as a prelude to the more detailed description provided below.

In some embodiments, a kit may include a first ferrule holder subassembly, a first assembly jig, a second ferrule holder subassembly, and a second assembly jig. The first ferrule holder subassembly may have an elongate body defining a first open-faced channel sized to receive an optical fiber ferrule. The first assembly jig may be affixed to the first ferrule holder subassembly. The first assembly jig may include a first set of one or more pairs of opposing tabs configured to maintain the first ferrule holder subassembly at a first fixed position relative to the first assembly jig. The second ferrule holder subassembly may have a second elongate body defining a second open-faced channel sized to receive the optical fiber ferrule. The second assembly jig may be affixed to the second ferrule holder subassembly. The second assembly jig may include a second set of one or more pairs of opposing tabs configured to maintain the second ferrule holder subassembly at a second fixed position relative to the second assembly jig.

In some embodiments, a method may include decoupling a first assembly jig from a second assembly jig slidably coupled to the first assembly jig in a first configuration. The method may include disposing a tip end of a ferrule coupled to an optical fiber within a ferrule guide portion of the first assembly jig. The method may include disposing a different portion of the ferrule within an open channel of a first ferrule holder subassembly coupled to the first assembly jig. The method may include coupling the first assembly jig to the second assembly in a second configuration different from the first configuration. The method may include moving the first assembly jig towards the second assembly jig until the first ferrule holder subassembly and a second ferrule holder subassembly snap together about the ferrule.

These and other aspects of the disclosure will be apparent upon consideration of the following detailed description of illustrative aspects.

BRIEF DESCRIPTION OF THE DRAWINGS

A more complete understanding of the present disclosure may be acquired by referring to the following description in consideration of the accompanying drawings, in which like reference numbers indicate like features, and wherein:

FIG. 1 illustrates a simplified functional representation of a complementary pair of connectors configured to optically mate with each other.

FIG. 2 illustrates a functional representation of the connectors of FIG. 1 in a mated configuration.

FIG. 4 illustrates a side perspective view of spring assembly of FIG. 3.

FIG. 5 illustrates an end view of spring assembly of FIG. 3 with the spring of FIG. 3 removed for clarity.

FIG. 6 illustrates another end view of spring assembly of FIG. 3 with the spring of FIG. 3 removed for clarity.

FIG. 7a illustrates a side view of the first subassembly component.

FIG. 7b illustrates another side view of the first subassembly component.

FIG. 7c illustrates an end view of the first subassembly component.

FIG. 7d illustrates another end view of the first subassembly component.

FIG. 7e illustrates a top view of the first subassembly component.

FIG. 7f illustrates a side view of the second subassembly component.

FIG. 7g illustrates another side view of the second subassembly component.

FIG. 7h illustrates an end view of the second subassembly component.

FIG. 7i illustrates another end view of the second subassembly component.

FIG. 7j illustrates a top view of the second subassembly component.

FIG. 8a illustrates a side view of the ferrule holder of FIG. 3.

FIG. 8b illustrates another side view of the ferrule holder of FIG. 3.

FIG. 9 illustrates an end view of the ferrule holder of FIG. 3.

FIG. 12 illustrates a side view of the sleeve assembly of FIG. 3 in a first configuration.

FIG. 13 illustrates a side view of the sleeve assembly of FIG. 3 in a second configuration.

FIG. 14 illustrates an end view of the sleeve assembly of FIG. 3.

FIG. 15 illustrates another end view of the sleeve assembly of FIG. 3.

FIG. 26 illustrates a side perspective view of the first and second subassembly holders in an initial configuration.

FIG. 27 illustrates another side perspective view of the first and second subassembly holders in an initial configuration.

FIG. 28 illustrates a side view of first and second subassembly holder moving from the initial configuration to a separate decoupled configuration.

FIG. 29 is a top view of the second subassembly holder.

It is noted that the various drawings are not necessarily to scale.

DETAILED DESCRIPTION

The various aspects summarized previously may be embodied in various forms. The following description shows by way of illustration various examples in which the aspects may be practiced. It is understood that other examples may be utilized, and that structural and functional modifications may be made, without departing from the scope of the present disclosure.

Referring to FIG. 1, a functional diagram shows an illustrative mating pair of optical connectors 101, 103. Each connector 101, 103 has its respective optical pathway for transferring information as modulated light. In the present example, these optical pathways are optical fibers 102, 104. When mated together via an adapter 105 as shown in FIG. 2, the optical pathways are optically coupled together so as to transfer the modulated light from one of the pathways to the other. As illustrated in FIG. 2, when connectors 101 and 103 are properly mated, optical fibers 102 and 104 are brought into contact with each other without an air gap, so as to allow light from one of the optical fibers 102, 104 to transfer into the other one of the optical fibers 102, 104.

An optical connector according to at least some embodiments may be configured so as to be relatively easily, quickly, and/or inexpensively connected to an optical fiber. For instance, the end user may not need a splicer to make the connection, since the connector does not need a pigtail. Thus, the connection may have the potential for contributing less signal loss than do connectorized pigtails, since a splice is no longer needed for each connector. Moreover, the connector may provide for appropriate axial, lateral, and/or rotational alignment of the optical fiber with the optical pathway of the opposing mating connector. Although there exist optical fiber connectors that can be field assembled, these connectors still require fusion splicing or mechanical splicing (with an index-matching gel). In contrast, examples of an optical connector suitable for field assembly will be described in which splicing is unnecessary for creation of the optical connection. Thus, the optical fiber remains intact and may allow for a more reliable and less lossy optical connection. Reliability over a long period of time is important for many applications, especially where the connection may be in a location that is difficult to access after installation, such as within a building wall or underground.

Figure 3:
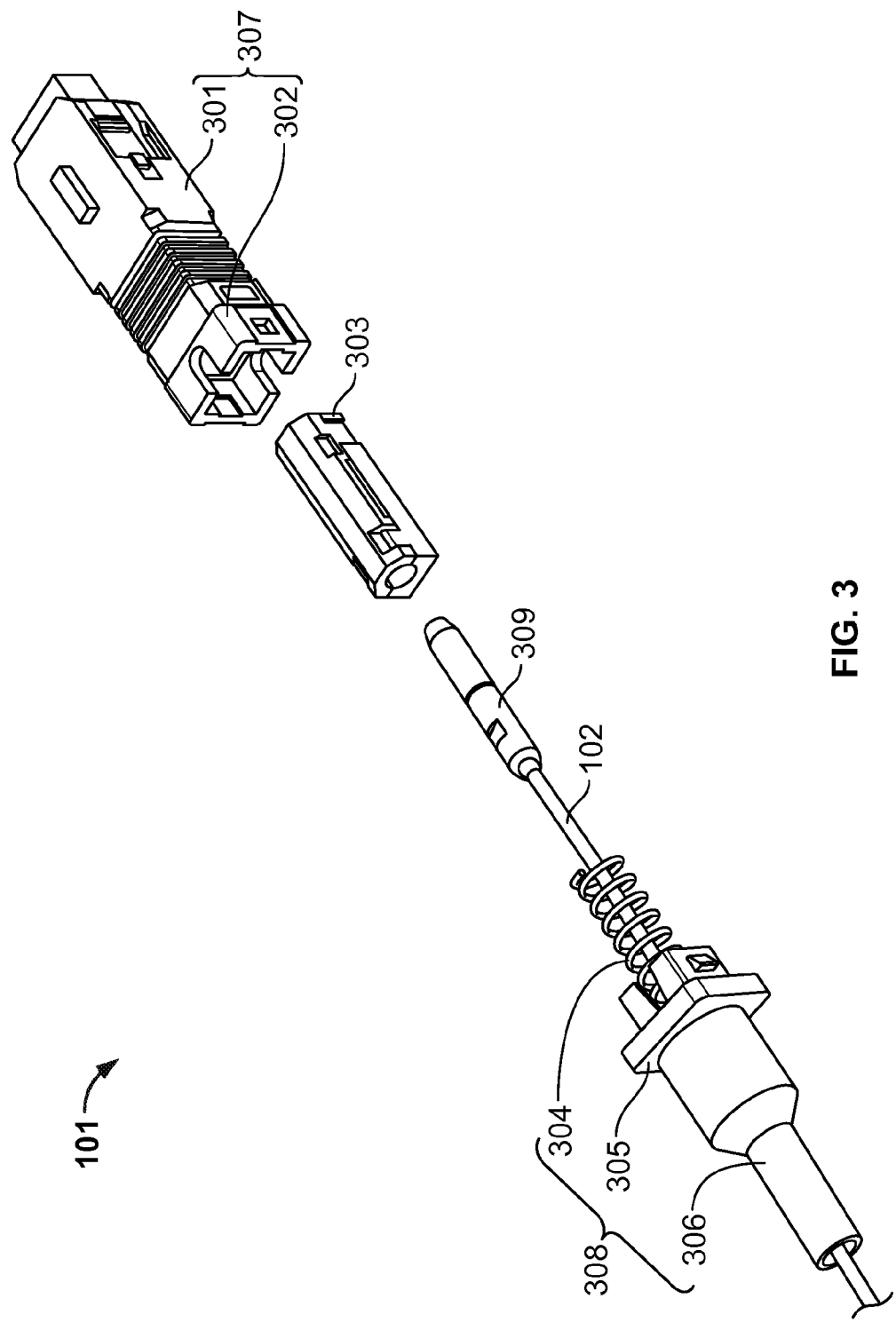
FIG. 3 illustrates a side perspective view of various component of an illustrative connector, including an illustrative connector cover coupled to an illustrative lock unit, an illustrative ferrule holder, an illustrative spring, an illustrative spring holder, and an illustrative tube.

FIG. 3 is a partially exploded perspective view showing various components of an illustrative connector, including an illustrative connector cover coupled to an illustrative lock unit, an illustrative ferrule holder, an illustrative spring, an illustrative spring holder, and an illustrative tube. For example, as shown in FIG. 3, connector 101 may include a connector cover 301, a lock unit 302, a ferrule holder 303, a spring 304, a spring holder 305, and a tube 306. When the connector cover 301 is combined with lock unit 302, the resulting combination may be referred to as a sleeve assembly 307. When the spring 304, the spring holder 305, and the tube 306 are combined, the resulting combination may be referred to as spring assembly 308. The components are shown in the arrangement in which they are combined in this example. Namely, connector cover 301 is placed over lock unit 302, which in turn is placed over ferrule holder 303 and a portion of spring assembly 308. To form sleeve assembly 307, locking unit 302 may be inserted into connector cover 301. To form spring assembly 308, spring 304 is inserted into spring holder 305, and spring holder 305 is inserted into tube 306. In addition, ferrule holder 303 is inserted into lock unit 302. The various components 301-308 may be made of any material or combination of materials, such as metal, plastic, and/or ceramic materials. As shown, a ferrule 309 couple to an end of optical fiber 102 has been threaded through spring assembly 308.

Each of these components 301-309 will be discussed both individually and in conjunction with one another to form an operational connector. FIGS. 4-15 illustrate each component of FIG. 3 in additional detail, with the exception of spring 304. Spring 304 may be a conventional spring. In the shown example, spring 304 is a coiled compression spring, and so a further detailed drawing of spring 304 is unnecessary. However, spring 304 may be another type of spring such as a coiled tension spring or a leaf spring.

FIGS. 4-6 show additional details of spring assembly 308. FIG. 4 is a side perspective view of spring assembly 308. FIGS. 5 and 6 respectively illustrate end views of spring assembly 308 with the spring 304 removed for clarity. A purpose of tube 306 is to hold spring holder 305, which may hold spring 304. As shown, tube 306 is generally an elongated hollow cylinder with a hollow enclosed channel 401 extending from a first end 402 to a second end 403 along its elongated axis and through which ferrule 309 coupled to optical fiber 102 may be threaded. The first end 402 may be configured to receive the spring holder 305 to affix tube 306 to spring holder 305 as will be discussed in greater detail below. The tube 306 may include one or more tapered portions (e.g., tapered portion 404). As a result, the first end 402 may have a greater width and/or diameter than a width and/or diameter of the second end 403. The tube 306 may be symmetric about its elongate axis.

As shown, spring holder 305 may define a hollow partially enclosed channel 405 extending from a first end 406 to a second end (not shown) along its elongate axis through which optical fiber 102 may be threaded. The first end 406 may include a pair of retaining tabs 407 protruding from opposite sides of first end 406. The retaining tabs 407 may be configured to lock and/or affix the spring holder 305 with locking unit 302 as will be discussed in greater detail below. The retaining tabs 407 may be substantially triangular, pyramidal, rectangular, and/or any other shape.

The second end of spring holder 305 may be configured to fixedly couple to first end 402 of tube 306. For example, when the second end of spring holder 305 is inserted into first end 402 of the tube 306, an outer surface of the second end of the spring holder 305 may contact an inner surface of first end 402 to form a male/female frictionally fixed mating between spring holder 305 and tube 306. In some embodiments, the outer surface of the second end of the spring holder 305 and/or the inner surface of the first end 402 may include an adhesive to affix the spring holder 305 with tube 306.

In addition, spring holder 305 may include a rim 408 that may radially extend outward from the spring holder 305. Rim 408 may be substantially rectangular in shape and may extend along a perimeter of spring holder 305. Rim 408 may abut and/or otherwise contact first end 402 of tube 306 when the second end of spring holder 305 is inserted into first end 402 of tube 306. As a result, rim 408 may prevent and/or otherwise block the spring holder 305 from being inserted any farther into tube 306.

The partially enclosed channel 405 may include an enclosed portion extending from rim 408 to the second end of the spring holder 305 and may include an open channel portion extending from rim 408 to first end 406 of spring holder 305. The open channel portion may include a pair of V-shaped openings (e.g., apertures) on opposing sides of the first end 406. The open channel portion may be configured to receive and fixedly couple to spring 304. For example, when an end of spring 304 is inserted into the open channel portion, an inner surface of the first end 406 may contact an outer surface of the spring 304 to form a male/female frictionally fixed mating between spring 304 and spring holder 305 as shown in FIG. 4. In some embodiments, the inner surface of the first end 406 may mechanically retain the spring 304 via a lip or ridge.

To form spring assembly 308, first end 406 of spring holder 305 is fixedly coupled to an end of the spring 304 and the second end of spring holder 305 is fixedly coupled to first end 402 of tube 306. As will be discussed in greater detail below, the assembled spring assembly 308 may be one component in field kit of a technician tasked with connecting optical fibers to one another.

FIGS. 7a-7e show various views of a first subassembly component (e.g., a first ferrule holder subassembly). FIGS. 7a and 7b respectively illustrate side views of the first subassembly component. FIGS. 7c and 7d respectively illustrate end views of the first subassembly component. FIG. 7e illustrates a top view of the first subassembly component.

Figure 31:
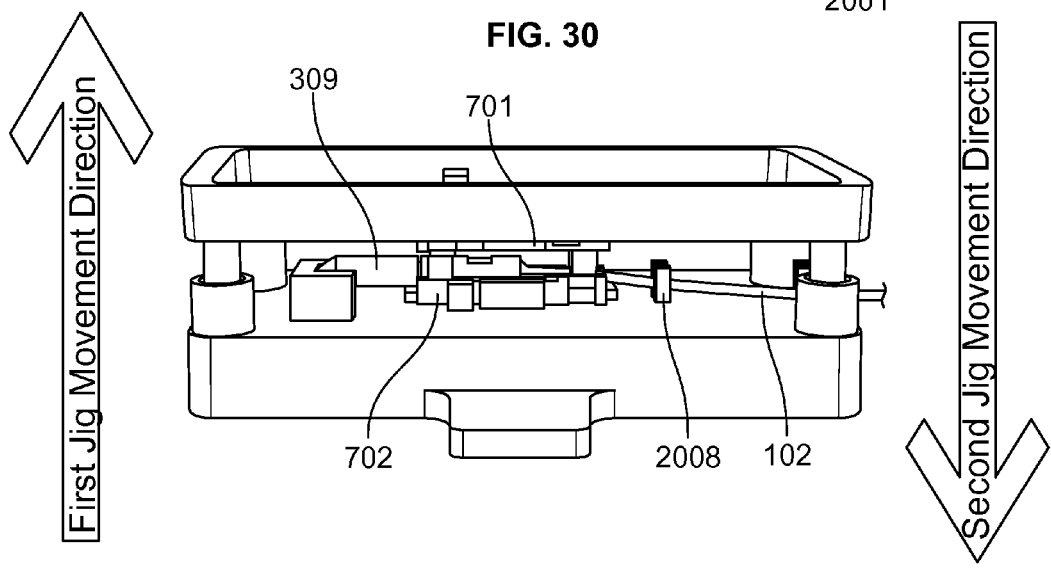
FIG. 31 illustrates a side view of the first and second subassembly holders at a second stage of coupling of the first subassembly component to the second subassembly component.

As shown, first subassembly component 701 may have a pair of opposing tabs 703 on opposite sides of first subassembly component 701. Similarly, first subassembly component 701 may have and/or otherwise define a pair of opposing recesses 704 on the opposite sides of first subassembly component 701. Each of the portions defining recesses 704 may include a lip (not shown), which will be discussed in detail below. The retaining tabs 703 and recesses 704 may be configured to couple to the second subassembly component 702 as will be discussed in greater detail below. The first subassembly component 701 may have an elongated body having a hollow U-shaped channel 705 that is exposed on one side (e.g., an open faced channel). Channel 705 is exposed so that, as shown in FIG. 31, ferrule 309 may be placed into channel 705 through the exposed side without the need for threading ferrule 309 lengthwise through channel 705. First subassembly component 701 may include one or more ferrule retaining ridges 706 disposed within the channel 705, which will be discussed in detail below. First subassembly component 701 may have a retention recess 712 that may be configured to couple to a first subassembly holder 1601, which will be described in detail below.

FIGS. 7f-7j show various views of a second subassembly component (e.g., a second ferrule holder subassembly). FIGS. 7f and 7g respectively illustrate side views of the second subassembly component. FIGS. 7h and 7i respectively illustrate end views of the second subassembly component. FIG. 7j illustrates a top view of the second subassembly component.

Second subassembly component 702 may have a pair of retaining tabs 707 on opposite side of second subassembly component 702. The second subassembly component 702 may also have a pair of recesses 708 on the opposite sides of second subassembly 702. Each of the portions defining recesses 708 may include a lip (not shown), which will be discussed in detail below. The retaining tabs 707 and recesses 708 may be configured to couple to the first subassembly component 701 as will be discussed in greater detail below. The second subassembly component 702 may have an elongated body having a hollow U-shaped channel 709 that is exposed on one side (e.g., an open faced channel). Channel 709 is exposed so that ferrule 309 may be placed into channel 709 through the exposed side without the need for threading ferrule 309 lengthwise through channel 709 as shown in FIG. 29. The second subassembly component 702 may include one or more ferrule retaining ridges 710 disposed within the channel 709. The second subassembly component 702 may include a retention recess 711 that may be configured to couple to a second subassembly holder 2001, which will be described in detail below.

FIGS. 8a-9 show various views of ferrule holder 303 (also referred to herein as subassembly or ferrule holder subassembly). As explained in further detail below, an optical fiber ferrule will typically be contained within ferrule holder 303 when the first and second subassembly components 701, 702 are assembled. An optical fiber ferrule is omitted in FIGS. 8a-9 for convenience. FIGS. 8a and 8b respectively illustrate side views of ferrule holder 303. FIG. 9 illustrates an end view of the ferrule holder 303.

The first subassembly component 701 may be affixed (e.g., fixedly coupled) to the second subassembly component 702. For example, the pair of opposing retaining tabs 707 may form a substantially C-shaped clip that can be slightly stretched open like a spring, which will then snap back to approximately its original shape to fit and remain within recesses 704. The lips of the recesses 704 may engage the retaining tabs 707 to affix the first subassembly component 701 to the second subassembly component 702. Similarly, the pair of opposing retaining tabs 703 may form a substantially C-shaped clip that can be slightly stretched open like a spring, which will then snap back to approximately its original shape to fit and remain within recesses 708. The lips of the recesses 708 may engage the retaining tabs 703 to affix the first subassembly component 701 to the second subassembly component 702.

Figure 10:
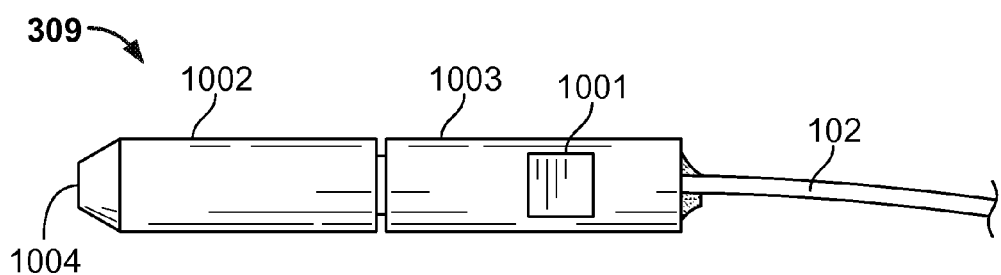
FIG. 10 illustrates a side view of the ferrule of FIG. 3.
Figure 11:
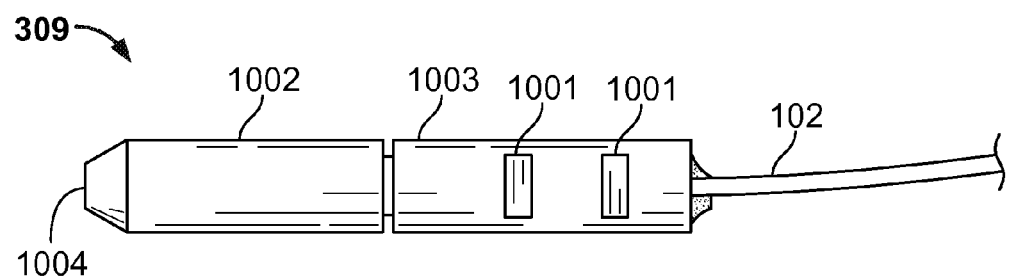
FIG. 11 illustrates another side view of the ferrule of FIG. 3.

When the first subassembly component 701 is affixed to the second subassembly component 702, the resulting combination may be referred to as ferrule holder 303. As shown, ferrule holder 303 may have a first end 801 and a second end 802 opposite the first end 801. When first subassembly component 701 is coupled to second subassembly component 702, the components 701 and 702 collectively form a closed channel 901 extending from end to end along its elongate axis. As will be discussed in detail below, the ferrule 309 may include multiple recesses 1001 to receive the ferrule retaining ridges 706, 710 to affix the ferrule 309 to the ferrule holder 303 when the ferrule 309 was disposed within the channels 705, 709 prior to affixing the first subassembly component 701 to the second subassembly component 702. Ferrule retaining ridges 706 and ferrule retaining ridges 710 may be asymmetrically disposed with respect to one another within the channel 901. As a result, ferrule 309, which has multiple recesses 1001 (as shown in FIGS. 10-11) configured to respectively receive the ferrule retaining ridges 706, 710, may only fit within the channel when oriented in one unique way (i.e., by aligning the recesses 1001 with the notches 706, 710). Accordingly, ferrule holder 303 may affix ferrule 309 in all degrees of freedom of motion (e.g., a fixed rotational orientation and longitudinal, i.e., lengthwise, position) relative to ferrule holder 303.

Ferrule holder 303 may include multiple straight edges 902 along its perimeter forming a substantially rectangular shape to maintain a predetermined rotational alignment of ferrule holder 303 relative to lock unit 302 while still allowing ferrule holder 303 to slide longitudinally within lock unit 302. Ferrule holder 303 may have one or more tapered edges 903 to indicate a particular orientation in which the ferrule holder 303 is to be inserted into lock unit 302 while preventing ferrule holder 303 from being inserted into lock unit 302 when the ferrule holder 303 is in a different orientation.

In some embodiments, open-faced channel 705 may have a first surface contour and open-faced channel 709 may have a second surface contour different from the first surface contour such that an optical fiber ferrule having a first portion within a third surface contour complimentary to the first surface contour and a second portion within a fourth surface contour complimentary to the second surface contour is only encasable between the first and second subassembly components 701, 702 in a single orientation.

FIGS. 10 and 11 show various side perspective views of a ferrule 309 couple to optical fiber 102. Ferrule 309 may include a ferrule component 1002 and ferrule tube 1003. Ferrule component 1002 has a generally elongated shape and has a hollow channel (not shown) extending completely through ferrule component 1002 along its lengthwise axis from a first aperture (not shown) to a second aperture (not shown). The channel is configured such that optical fiber 102 may be threaded through the channel (albeit it may be stripped version of optical fiber 102, i.e., stripped of its protective covering, that passes through the channel). In passing the optical fiber 102 through the channel, a glue or adhesive may be added to the interior surface of the channel and/or the exterior surface of optical fiber 102 to affix optical fiber 102 to ferrule component 1002.

Ferrule component 1002 may have a narrower portion (not shown) for receive ferrule tube 1003. This narrower portion is configured such that when put together, ferrule component 1002 and ferrule tube 1003 form a single approximately flush exterior cylindrical surface, as shown in FIGS. 10 and 11. Together, ferrule component 1002 and ferrule tube 1003 form ferrule 309. The ferrule tube 1003 may have a hollow aperture (not shown) for receiving narrower portion of the ferrule component 1002. The ferrule tube 1003 may include multiple recesses 1001 configured to engage corresponding ferrule notches 706, 710 of the first and second subassembly components 701, 702. A glue or other adhesive may be applied on the surface of the narrower portion of the ferrule component 1002 and/or an interior surface of the channel of the ferrule tube 1003 to affix the ferrule component 1002 to the ferrule tube 1003.

After optical fiber 102 is affixed to the ferrule 309, the tip 1004 of the optical fiber 102 is cut and polished. In addition, tip 1004 may be cut at an angle to the lengthwise axis of the optical fiber 102 and ferrule 309 so as to reduce potential signal reflection. The rotational orientation of the angled surface of the tip 1004 about the longitudinal axis of optical fiber 102 may be set at a particular orientation depending upon the rotational position of one of the recesses 1001. In other words, one of the recesses 1001 may be used as a point of reference for cutting the angled surface of tip 1004.

Ferrule component 1002 and ferrule tube 1003 may be made of the same materials or different materials than each other. For instance, the ferrule component 1002 may be made of ceramic or plastic, while ferrule tube 1003 may be made of metal. Where ferrule component 1002 is made of ceramic, it may be easier control precise dimensions, such as concentricity, than where ferrule component 1002 is made of metal or other materials. Manufacturing a ceramic ferrule component 1002 versus a metal ferrule component 1002 may result in as much as a ten-fold reduction in fiber-to-ferrule concentricity errors. As a result, connection losses may be reduced especially where connector 101 is connected to a standard SC-type connector or other connector where optical fiber 102 must precisely align with optical fiber 104.

As discussed above, when recesses 1001 receive ferrule notches 706, 710, this allows ferrule 309 (and thus optical fiber 102) to be fixed in a particular rotational orientation relative to ferrule holder 303 (and indeed relative to the entire optical connector 101 once assembled).

FIGS. 12-15 show various views of sleeve assembly 307. FIGS. 12 and 13 illustrate a side view of the sleeve assembly 307 in a first configuration and a second configuration, respectively. FIGS. 14 and 15 respectively illustrate end views of the sleeve assembly 307.

As shown in FIGS. 12 and 13, lock unit 302 may be slidably disposed within an elongated hollow channel (not shown) of connection cover 301 extending from end to end along its elongate axis. When the sleeve assembly 307 is in the first configuration, the ends of lock unit 302 may extend beyond the ends of connection cover 301. When the sleeve assembly 307 is in the second configuration, an end of the lock unit 302 may be substantially flush with an end of the connection cover 301 while the other end of the lock unit 302 may extend beyond the other end of the connection cover 301.

Connection cover 301 may be slidably coupled to lock unit 302 along the elongate axis to enable the sleeve assembly 307 to move between the first configuration and the second configuration. Connection cover 301 may include have and/or otherwise define a pair apertures 1201 on opposing sides of the connection cover 301. Lock unit 302 may include multiple pairs of tabs 1202 protruding radially from opposite sides of lock unit 302 and may be configured to engage an edge of the apertures 1201 to limit a distance the connection cover 301 may slide with respect to the lock unit 302 to thereby define the first configuration and the second configuration. For example, when the sleeve assembly 307 is in the first configuration, a first pair of tabs 1202a may engage and/or otherwise abut a respective edge of the recesses 1201 to prevent lock unit 302 from slidably moving any farther in a first longitudinal direction with respect to connection cover 301. Similarly, when sleeve assembly 307 is the second configuration, a second pair of tabs 102b may engage and/or otherwise abut a different respective edge of recesses 1201 to prevent lock unit 302 from slidably moving any farther in a second longitudinal direction with respect to connection cover 301. The second longitudinal direction may be opposite the first longitudinal direction. In some embodiments, the connection cover 301 and the lock unit 302 may be made of any material or combination of materials, such as metal, plastic, and/or ceramic materials. In some embodiments, the connection cover 301 and/or the lock unit 302 may be made of flexible plastic with a springy portion to maintain the sleeve assembly 307 in either a biased first configuration or in a biased second configuration.

Additionally, lock unit 302 may include a locking portion 1203 that may be configured to engage and/or otherwise contact an end of the connection cover 301 to aid in preventing lock unit 302 from slidably moving any farther in the first longitudinal direction with respect to connection cover 301 when the sleeve assembly 307 is in its first configuration. Locking portion 1203 may include and/or otherwise define a pair of apertures 1204 on opposite sides of the locking portion 1203. Apertures 1204 configured to respectively receive retaining tabs 407 of spring holder 305 to affix locking unit 302 to spring holder 305, which will be discussed in detail below.

Lock unit 302 may have and/or otherwise define a hollow enclosed channel 1401 from end to end along its elongate axis. The channel may include a first portion 1402, a second portion 1501 opposite the first portion 1402, and a middle portion 1502 between the first portion 1402 and the second portion 1501. An inner surface of the first portion 1402 may be configured to receive ferrule holder 303. For example, the inner surface of the first portion 1402 may be shaped substantially similar to an outer surface of the ferrule holder 303. Because the ferrule holder 303 has straight edges 902 and tapered edges 903, the ferrule holder 303 may only be inserted into the first portion 1401 in one rotational orientation. As a result, when ferrule holder 303 is disposed within the first portion 1401, the rotational orientation of ferrule 309 coupled to ferrule holder 303 is fixed with respect to sleeve assembly 307.

Middle portion 1502 may have a width (e.g., a diameter) less than a width of the first portion 1401 and a width of the second portion 1501. As a result, a surface of the middle portion 1502 may engage and/or otherwise abut an end of ferrule holder 303 to prevent ferrule holder 303 from being inserted any farther into channel 1401. The width of the middle portion 1502 may be of sufficient size to permit a tip of ferrule 309 to be threaded through it.

Figure 18:
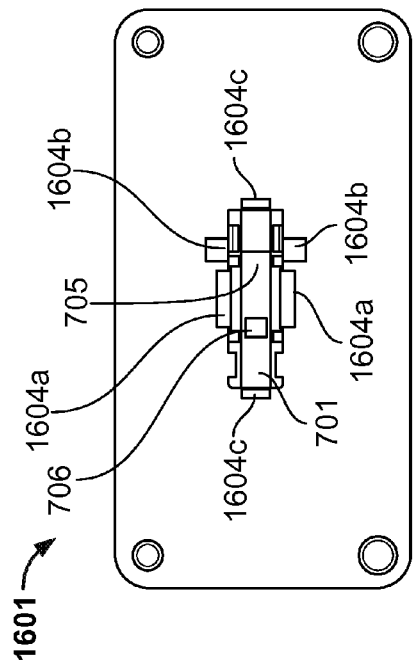
FIG. 18 illustrates a top view of the first subassembly holder affixed to the first subassembly component.
Figure 19:
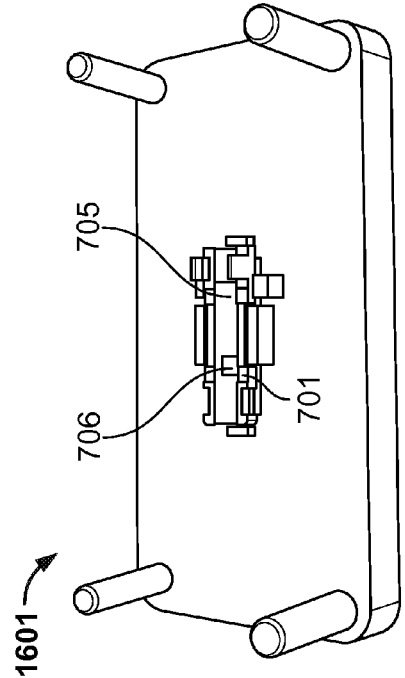
FIG. 19 illustrates a side perspective view of the first subassembly holder affixed to the first subassembly component.
Figure 16:
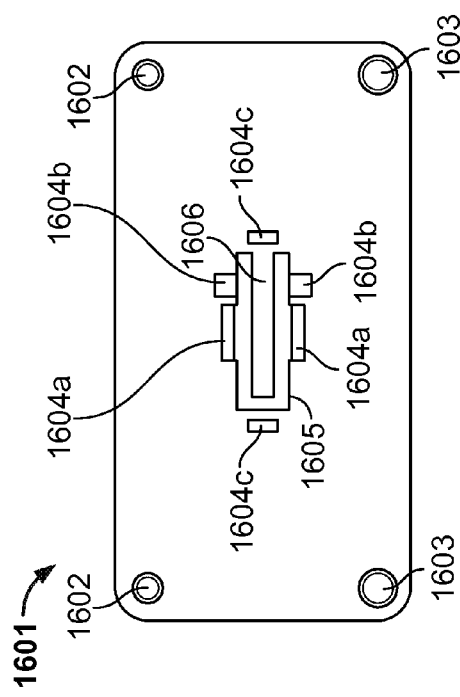
FIG. 16 illustrates a top view of the first subassembly holder.
Figure 17:
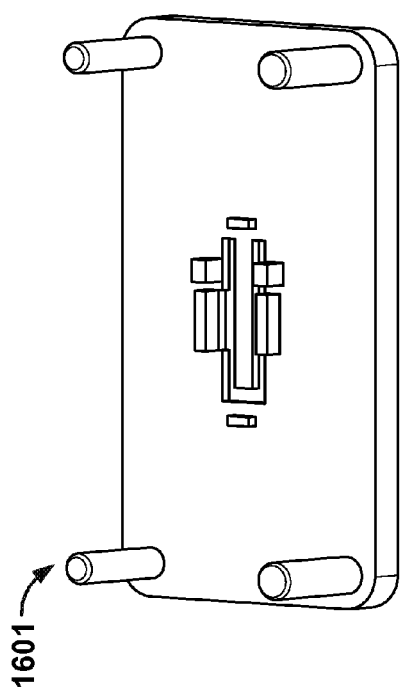
FIG. 17 illustrates a side perspective view of the first subassembly holder.

FIGS. 16-19 illustrate various views of the first subassembly holder 1601 (e.g., a first assembly jig). FIGS. 16 and 17 respectively illustrate a top view and a side perspective view of first subassembly holder 1601. FIGS. 18 and 19 respectively illustrate a top view and a side perspective view of first subassembly holder 1601 affixed to first subassembly component 701.

As shown, first subassembly holder 1601 may include a first set guide rods 1602 extending from a top face of first subassembly holder 1601 and a second set of guide rods 1603 also extending from the top face of first subassembly holder 1601. A width (e.g., a diameter) of each of the first set of guide rods 1602 may be less than a width (e.g., a diameter) of each of the second set of guide rods 1603. The width of each of the first set of guide rods 1602 may be equal to one another and the width of each of the second set of guide rods 1603 may be equal to one another. Additionally, each of the guide rods 1602, 1603 may be parallel to one another.

Additionally or alternatively, in some embodiments, the first set of guide rods 1602 may be geometrically dissimilar from the second set of guide rods 1603. The guide rods 1602, 1603 may be configured to mate with corresponding complimentary features of the second subassembly holder 2001 in one orientation (e.g., a single orientation). For example, the first set of guide rods 1602 may be substantially circular in shape and the second set of guide rods 1603 may be substantially rectangular in shape. The corresponding complementary features of the second subassembly holder 2001 may be the same shape as their corresponding guide rod 1602, 1603.

First subassembly holder 1601 may include one or more pairs of opposing tabs 1604 protruding from the top face of the first subassembly holder 1601. The pairs of opposing tabs 1604 may be configured to the fixedly couple to and retain the first subassembly component 701 in between them as shown in FIGS. 18 and 19. For example, one or more the tabs 1604 may include an elastic retaining ridge or lip to engage and mechanically retain the first subassembly component 701. Additionally or alternatively, in some embodiments, the pairs of opposing tabs 1604 may be spaced so as to frictionally retain the first subassembly component 701 in between them. Each of the pairs of opposing tabs 1604 may be either the same or of different sizes. At least one pair of opposing tabs 1604 may be perpendicular to another pair of opposing tabs 1604 (e.g., pair of opposing tabs 1604a is shown as being perpendicular to pair of opposing tabs 1604c). At least one of the tabs 1604 may be positioned to be received by the recess 712 of the first subassembly component 701 when the first subassembly component 701 is coupled to the first subassembly holder 1601.

First subassembly holder 1601 may have and/or otherwise define an aperture 1605 extending from the top face of the first subassembly holder 1601 to a bottom face of the first subassembly holder 1601. The aperture 1605 may be C-shaped to thereby form flexible release tab 1606, which may be flush with the top face and bottom face of the first subassembly holder 1601. Aperture 1605 and release tab 1606 may be disposed and/or otherwise located between each of the pairs of opposing tabs 1604 such that first subassembly component 701 may be in contact with release tab 1606 when the first subassembly component 701 is coupled to the first subassembly holder 1601. Release tab 1606 may be flexible and, thus, may move between a flexed configuration and a biased straight configuration. As a result, when the first subassembly component 701 is coupled to the first subassembly holder 1601 and the release tab 1606 is moved by a user toward the first subassembly component 701, the release tab 1606 may decouple the first subassembly component 701 from the first subassembly holder 1601. For example, in such an instance, the release tab 1606 may move the first subassembly component 701 thereby disengaging the first subassembly component 701 from being contacted and retained by the pairs of opposing tabs 1604.

Figure 20:
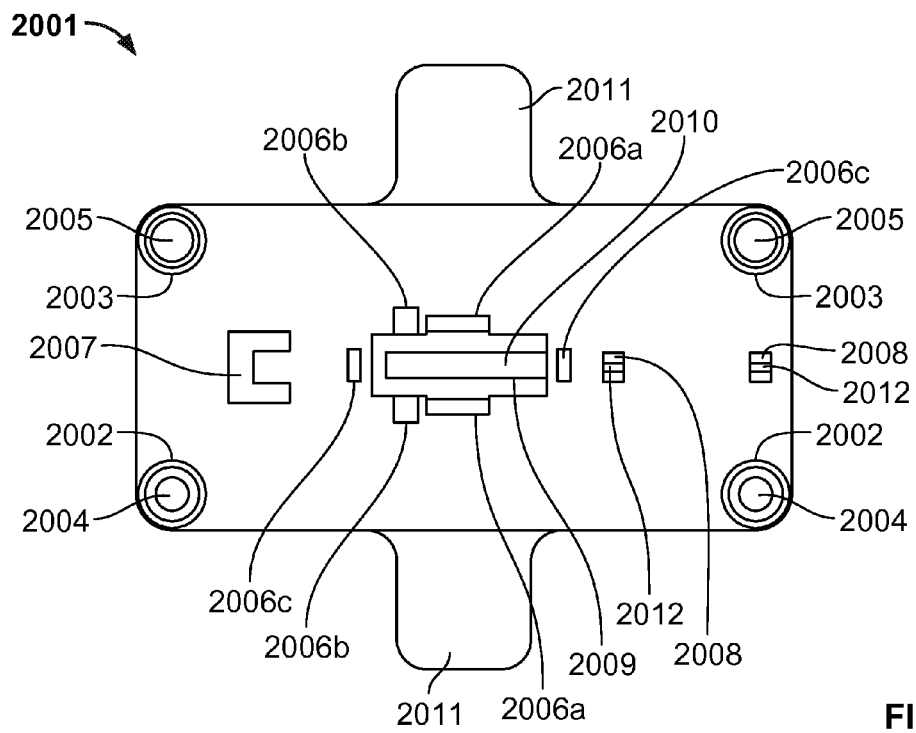
FIG. 20 illustrates a top view of the second subassembly holder.
Figure 21:
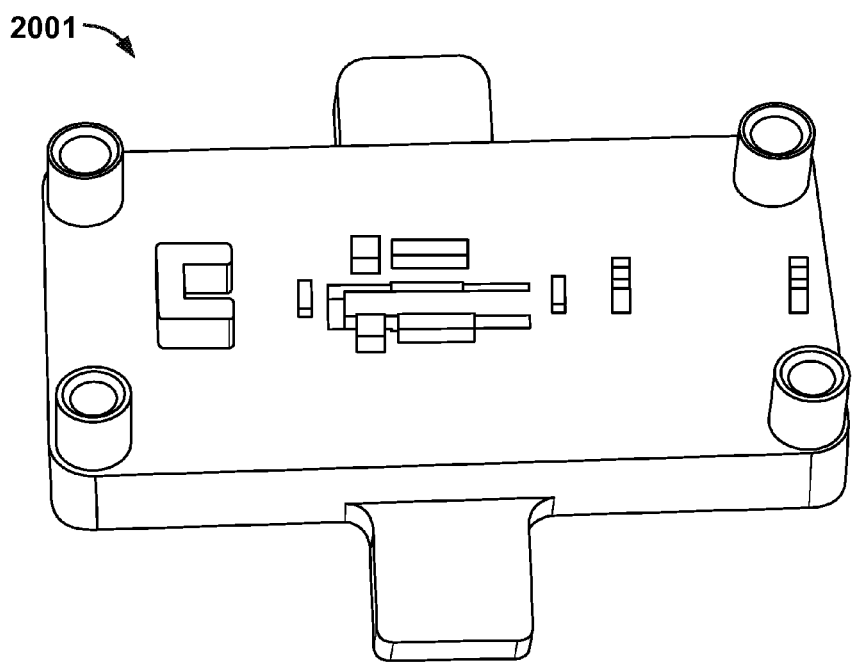
FIG. 21 illustrates a side perspective view of the second subassembly holder.
Figure 22:
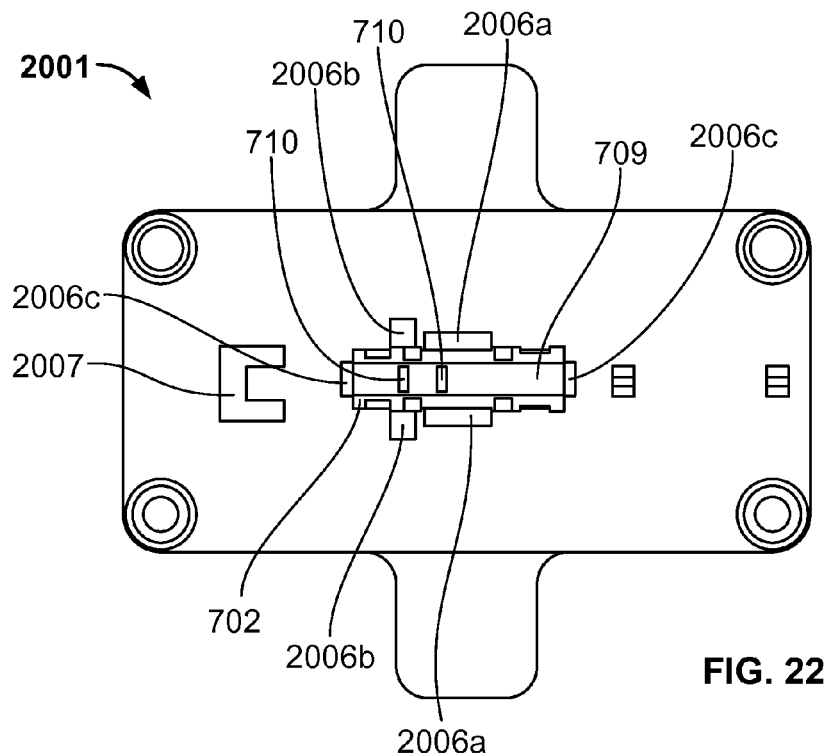
FIG. 22 illustrates a top view of the second subassembly holder affixed to the second subassembly component.
Figure 23:
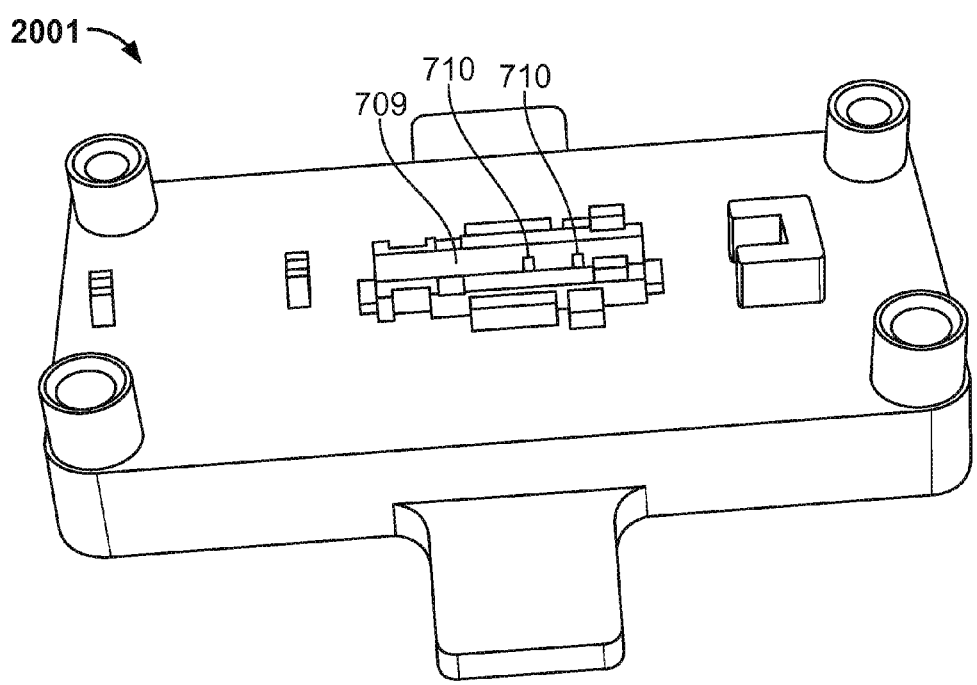
FIG. 23 illustrates a side perspective view of the second subassembly holder affixed to the second subassembly component.

FIGS. 20-23 illustrate various views of the second subassembly holder 2001 (e.g., a second assembly jig). FIGS. 20 and 21 respectively illustrate a top view and a side perspective view of the second subassembly holder 2001. FIGS. 22 and 23 respectively illustrate a top view and a side perspective view of the second subassembly holder 2001 affixed to the second subassembly component 702.

As shown, second subassembly holder 2001 may include a first set of guide tubes 2002 extending from a top face of the second subassembly holder 2001 and a second set of guide tubes 2003 extending from the top face of the second subassembly holder 2001. The first set of guide tubes 2002 may each be an elongated hollow cylinder with an enclosed channel 2004 extending from end to end along its elongate axis through which a respective guide rod 1602 may be threaded. The second set of guide tubes 2003 may each be an elongated hollow cylinder with an enclosed channel 2005 extending from end to end along its elongate axis through which a respective guide rod 1603 may be threaded. Each of the guide tubes 2002, 2003 may be parallel to one another.

Additionally or alternatively, in some embodiments, the second set of guide tubes 2002 may be geometrically dissimilar from the second set of guide tubes 2003 such that it will mate with complimentary features of the first subassembly guide holder 1601. For example, the cross-sectional shape of the channels 2004, 2005 of the guide tubes 2002, 2003 may be substantially rectangular in shape.

First set of guide tubes 2002 may be configured to receive the corresponding first set of guide rods 1602 in either end of the guide tubes 2002. Similarly, second set of guide tubes 2003 may be configured to receive the corresponding second set of guide rods 1603 in either end of the guide tubes 2003.

A width (e.g., a diameter) of each channel 2004 of the first set of guide tubes 2002 may be less than a width (e.g., a diameter) of each channel 2005 of the second set of guide tubes 2003. The width of the each channel 2004 may be equal to one another and the width of each channel 2005 may be equal to one another. As a result, the channels 2004 of the first set of guide tubes 2002 might not be able to receive the second set of guide rods 1603.

Second subassembly holder 2001 may include one or more pairs of opposing tabs 2006 protruding from the top face of the second subassembly holder 2001. The pairs of opposing tabs 2006 may be configured to fixedly couple to and retain second subassembly component 702 in between them as shown in FIGS. 22 and 23. For example, one or more tabs 1604 may include an elastic retaining ridge or lip to engage and mechanically retain the second sub assembly component 702. Additionally or alternatively, in some embodiments, the pairs of opposing tabs 2006 may be spaced so as to frictionally retain the second subassembly component 702 in between them. Each of the pairs of opposing tabs 2006 may either the same or different sizes. At least one pair of opposing tabs 2006 may be perpendicular to another pair of opposing tabs 2006 (e.g., pair of opposing tabs 2006*a* is shown as being perpendicular to pair of opposing tabs 2006*c*). At least one of tabs 2006 may be positioned to be received by the recess 711 of the second subassembly component 702 when second subassembly component 702 is affixed to second subassembly holder 2001.

Second subassembly holder 2001 may include ferrule guide component 2007, which may protrude from the top face of second subassembly holder 2001. Ferrule guide component 2007 may be substantially C-shaped with its opening facing the pairs of opposing tabs 2006. Additionally, its opening may face an end of second subassembly component 702 when affixed to second subassembly holder 2001. For example, its open face may align with an elongate axis defined by the open-faced channel 709 of the second subassembly component 702. Ferrule guide component 2007 may be set at a predefined distance from at least one of the tabs 2006 and/or at a predefined distance from the end of the second subassembly component 702. As a result, as shown in FIG. 29, when ferrule 309 is disposed within second subassembly component 702 and ferrule guide portion 2007, a tip of ferrule 309 is disposed at a predefined distance from the second subassembly component 702.

Second subassembly holder 2001 may include multiple optical fiber holders 2008 configured to couple to optical fiber 102. The optical fiber holders 2008 may protrude from the top face of second subassembly holder 2001 and may be a substantially U-shaped clip that is exposed on one side, which can be slightly stretched open like a spring to allow optical fiber 102 to be placed within the optical fiber holders 2008 through the stretched exposed side without the need for threading optical fiber 102 lengthwise through optical fiber holders 2008. The optical fiber holders 2008 will then snap back to approximately its original shape to fit and slidably retain optical fiber 102 within optical fiber holders 2008. Second subassembly holder 2001 may have and/or otherwise define apertures 2012 extending from the top face to the bottom face as shown in FIG. 20 to permit a technician to view the optical fiber 102 from a bottom face of the second subassembly holder 2001 when optical fiber 102 is coupled to the optical fiber holders 2008. An example of optical fiber 102 coupled to the optical fiber holders 2008 is shown in FIG. 29.

As shown in FIG. 20, second subassembly holder 2001 may have and/or otherwise define an aperture 2009 extending from the top face of the second subassembly holder 2001 to the bottom face of second subassembly holder 2001. Aperture 2009 may be C-shaped to thereby form a flexible release tab 2010 that may be flush with the top face and the bottom face of the second subassembly holder 2001. Aperture 2009 and release tab 2010 may be disposed and/or otherwise located between each of the pairs of opposing tabs 2006 such that second subassembly component 702 may be in contact with release tab 2010 when the second subassembly component 702 is affixed to the second subassembly holder 2001. Release tab 2010 may be flexible and, thus, may move between a flexed configuration and a biased straight configuration. As a result, when the second subassembly component 702 is affixed to the second subassembly holder 2001 and the release tab 2010 is moved by a user toward the second subassembly component 702, the release tab 2010 may decouple the second subassembly component 702 from the second subassembly holder 2001. For example, in such an instance, release tab 2010 may move the second subassembly component 702 thereby disengaging the second subassembly component 702 from being contacted and retained by the pairs of opposing tabs 2006.

Second subassembly holder 2001 may include a pair of holding tabs 2011 extending from opposite sides of subassembly holder 2001. Holding tabs 2011 may be configured to facilitate a technician in holding on to and/or otherwise manipulating second subassembly holder 2001. For example, holding tabs 2011 may aid the technician in decoupling and/or other separating the second subassembly holder 2001 from the first subassembly holder 1601. In some embodiments, the holding tabs 2011 may serve to indicate which subassembly holder 1601, 2001 is which (e.g., the holding tabs 2011 may indicate that the holder with the holding tabs 2011 is the second subassembly holder 2001).

Figure 24:
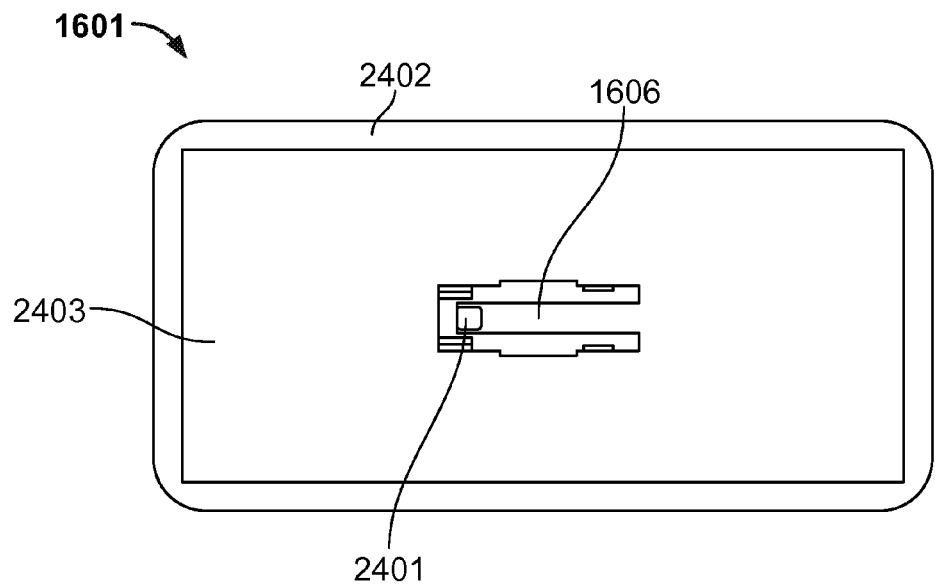
FIG. 24 illustrates a bottom view of the first subassembly holder.

FIG. 24 illustrates a bottom view of first subassembly holder 1601. First subassembly holder 1601 may include the release tab 1606 that may be substantially flush with a bottom face of first subassembly holder 1601. Release tab 1606 may be coupled to a release nob 2401 extending from the bottom face of the first subassembly holder 1601. In some embodiments, the release tab 1606 and the release nob 2401 may be unitarily formed. Release nob 2401 may be configured to aid a technician in manipulating and/or moving the release tab 1606 from its biased straight configuration to its flexed configuration to decouple the first subassembly component 701 from the first subassembly holder 1606. For example, a technician may depress the release nob 2401 to thereby move the release tab 1606.

First subassembly holder 1601 may include rim 2402 extending along an outer perimeter of first subassembly holder 1601. Rim 2402 may protrude from the bottom face of first subassembly holder 1601 and may provide structural support to the first subassembly holder 1601. Rim 2402 may define a recess 2403 having a depth greater than a length of the release nob 2401. As a result, a technician may place first subassembly holder 1601 on a surface with its bottom face down without engaging and/or otherwise moving the release nob 2402 and release tab 1606 so to prevent inadvertent release of the first subassembly component 701.

Figure 25:
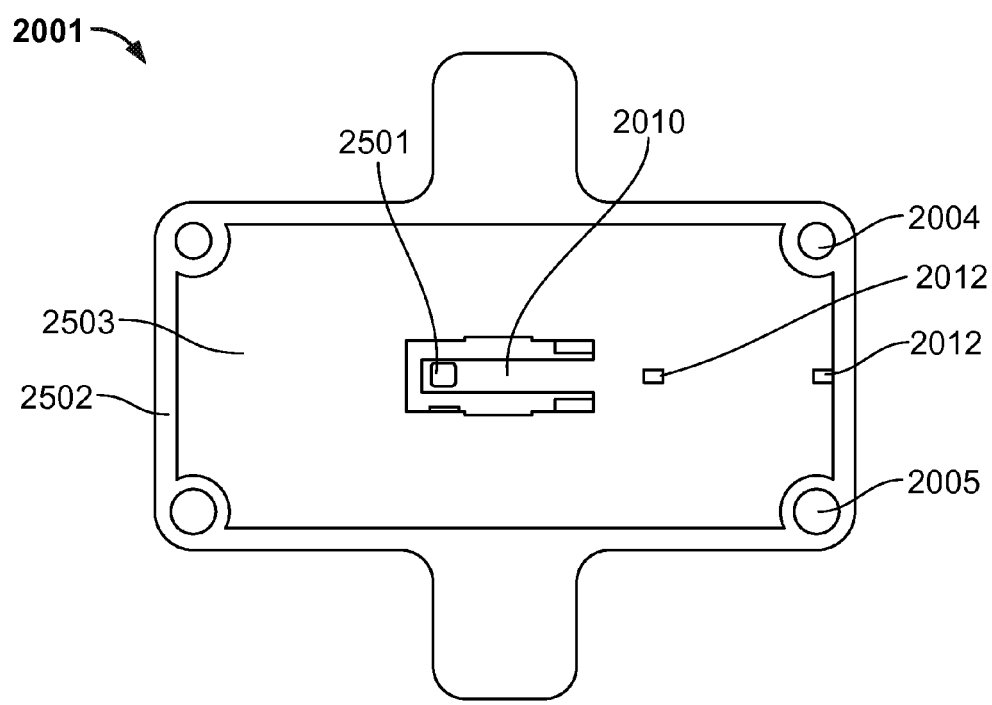
FIG. 25 illustrates a bottom view of the second subassembly holder.

FIG. 25 illustrates a bottom view of second subassembly holder 2001. Second subassembly holder 2001 may include the release tab 2010 that may be substantially flush with the bottom face of second subassembly holder 2001. Release tab 2010 may be coupled to a release nob 2501 extending from the bottom face of second subassembly holder 2001. In some embodiments, release nob 2501 and release tab 2010 may be unitarily formed. Release nob 2501 may be configured to aid a technician in manipulating and/or moving release tab 2010 from its biased straight configuration to its flexed configuration to decouple the second subassembly component 702 from the second subassembly holder 2001. For example, a technician may depress the release nob 2501 to thereby move the release tab 2010.

Second subassembly holder 2001 may include a rim 2502 extending along an outer perimeter of second subassembly holder 2001. Rim 2502 may protrude from the bottom face of the second subassembly holder 2001 to thereby define a recess 2503 having a depth greater than a length of the release nob 2501 and greater than a height of the first subassembly component 701. As a result, the release nob 2501 and the first subassembly component 701 may be entirely disposed within the recess 2503. Additionally, a technician may place the second subassembly holder 2001 on top of the first subassembly holder 2001 affixed to the first subassembly component 701 with its bottom facedown without engaging and/or otherwise moving release nob 2501 and release tab 2010 so as to prevent inadvertent release of the second subassembly component 702.

FIGS. 26 and 27 respectively illustrate various side perspective views of the first and second subassembly holders 1601, 2001 in a storage configuration (e.g., a packaged or initial configuration in which the subassembly holders 1601, 2001 may be packaged in a field kit prior to use by a technician). FIG. 28 illustrates a side view of first and second subassembly holders 1601, 2001 moving from the initial configuration to a separate decoupled configuration.

As discussed above, the channels 2004 of the first set of guide tubes 2002 may receive the first set of guide rods 1602 and the channels 2005 of the second set of guide tubes 2003 may receive the second set of guide rods 1603. In an instance where the guide rods 1602, 1603 are inserted into their respective channels 2004, 2005, the first and second subassembly holders 1601, 2001 may be in a first stacked configuration (i.e., the initial configuration). In such an instance, the rim 2502 of the second subassembly holder 2001 may contact the top face of the first subassembly holder 1601. Additionally, in such an instance, the first subassembly component 701 affixed to the first subassembly holder 1601 may be entirely disposed within the recess 2503 of the second subassembly holder 2001 without engaging the release nob 2501 of the second subassembly holder 2001. In use, a field kit of a technician may include the first and second subassembly holders 1601, 2001 in the initial configuration as shown in FIGS. 26 and 27. The technician may then decouple the second subassembly holder 2001 from the first subassembly holder 1601 by pulling on the holding tabs 2011. For example, the second subassembly holder 2001 may be moved in a first jig movement direction and the first subassembly holder 1601 may be moved in a second jig movement direction opposite the first jig movement direction as shown in FIG. 28.

Because a width of the second set of guide rods 1603 is greater than a width of the channels 2004, the first set of guide tubes 2002 may prevent the second set of guide rods 1603 from being received in its channel 2004. As a result, the first and second subassembly holders 1601, 2001 may only be coupled in the initial configuration in a single orientation.

FIG. 29 is a top view of second subassembly holder 2001. Once the first and second subassembly holders 1601, 2001 have been moved from their initial configuration to the decoupled configuration, the technician may place the tip of ferrule 309 into ferrule guide component 2007 and a different portion of ferrule 309 into the second subassembly component 702 by aligning the ferrule notches 710 with the respective recesses 1001 of the ferrule 309. Additionally, optical fiber 102 may be coupled to the optical fiber holders 2008.

Figure 30:
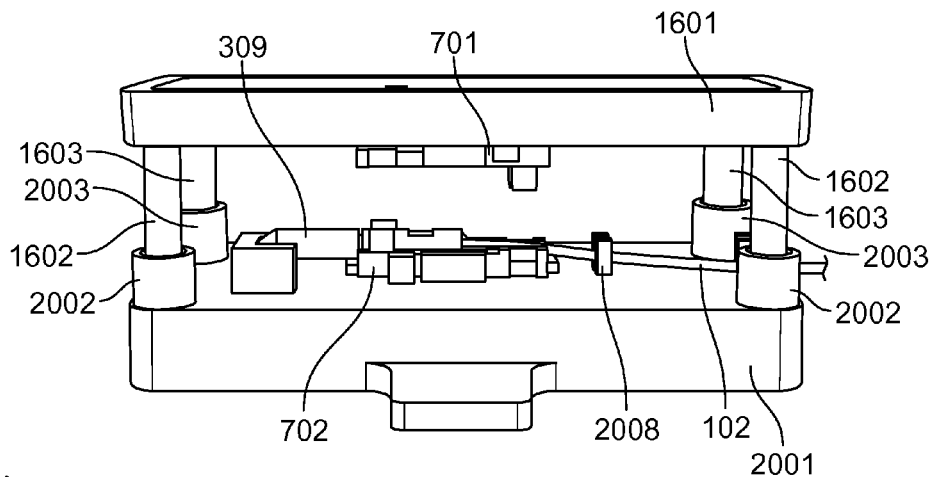
FIG. 30 illustrates a side view of the first and second subassembly holders at a first stage of coupling of the first subassembly component to the second subassembly component.

FIGS. 30 and 31 are various side views of the first and second subassembly holders 1601, 2001 at various stages of coupling the first subassembly component 701 to the second subassembly component 702. Once the ferrule 309 is placed within the second subassembly component 702 as shown in FIG. 29, the technician may insert the first set of guide rods 1602 into the first set of guide tubes 2002 and insert the second of guide rods 1603 into the second set of guide tubes 2002 such that the ferrule 309, the first subassembly component 701, and the second subassembly component 702 are disposed between the first subassembly holder 1601 and the second subassembly holder 2001 as shown in FIG. 30.

As discussed above, because the width of the second set of guide rods 1603 is greater than the width of channel 2004 of the first set of guide tubes 2002, the first set of guide tubes 2002 may prevent and/or otherwise block the technician from inserting the second set of guide rods 1603 into the first set of guide tubes 2002. Accordingly, the technician may only couple the first subassembly holder 1601 to the second subassembly holder 2001 in one orientation while having ferrule 309, first subassembly component 701, and second subassembly component 702 disposed between the first subassembly holder 1601 and the second subassembly holder 2001. In such an instance, the first subassembly component 701 is aligned with the second subassembly component 702 to permit them to couple to one another as the first subassembly holder 1601 is moved towards the second subassembly holder 2001 as shown in FIG. 31. Additionally, the ferrule notches 706 of the first subassembly component 701 may be aligned with respective recesses 1001 of the ferrule 309. The second subassembly holder 2001 may be moved in a first jig movement direction and the first subassembly holder 1601 may be moved in a second jig movement direction opposite the first jig movement direction as shown FIG. 31. In other words, the first and second subassembly holders 1601, 2001 may be moved towards one another until the first subassembly component 701 couples to the second subassembly component 702 (e.g., until the tabs of the each subassembly component snap fit with the corresponding recesses of the other subassembly component as discussed above).

Once the first subassembly component 701 is coupled to the second subassembly component 702 forming the ferrule holder 303, the ferrule 309 is fixedly coupled to ferrule holder 303. In other words, the ferrule notches 706, 710 are disposed within recesses 1001 of the ferrule 309 to prevent the ferrule 309 from sliding lengthwise through channel 901. Accordingly, the ferrule holder 303 affixes the ferrule 309 in all degrees of freedom of motion (e.g., a fixed rotational orientation and longitudinal, i.e., lengthwise, position) relative to ferrule holder 303. Additionally or alternatively, in some embodiments, the channel 901 of the ferrule holder 303 is sufficiently narrow to prevent the ferrule 309 from sliding lengthwise through channel 901.

The technician may now decouple the ferrule holder 303 from the first and second subassembly holders 1601, 2001. For example, the technician may depress the release nob 2401 to move release tab 1606 to its flexed position thereby decoupling the ferrule holder 303 from the first subassembly holder 1601. For example, the release tab 1606 may move the ferrule holder 303 such that the ferrule holder 303 is no longer disposed within tabs 1604 of the first subassembly holder 1601. Similarly, the technician may depress the release nob 2501 to move release tab 2010 to its flexed position thereby decoupling the ferrule holder 303 from the second subassembly holder 2001. For example, the release tab 2010 may move the ferrule holder 303 such that the ferrule holder 303 is no longer disposed within tabs 2006 of the second subassembly holder 2001.

Figure 32:
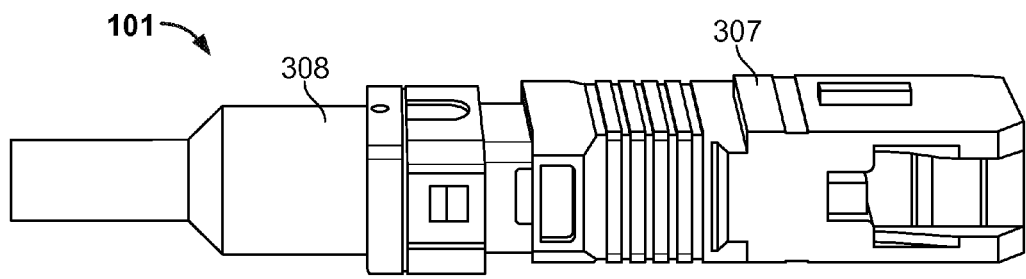
FIG. 32 illustrates the sleeve assembly, the ferrule holder, and the spring assembly coupled to one another to form an optical connector.

FIG. 32 illustrates the sleeve assembly 307, the ferrule holder 303, and the spring assembly 308 coupled to one another to form optical connector 101. The optical connector 101 may be an SC-P type optical connector or any other type of optical connector, and may be made completely or mostly of, for instance, plastic or another moldable material. In addition, the optical connector may be assembled in the field without the need for any assembly tools, as the parts may be configured to simply snap together.

Figure 33:
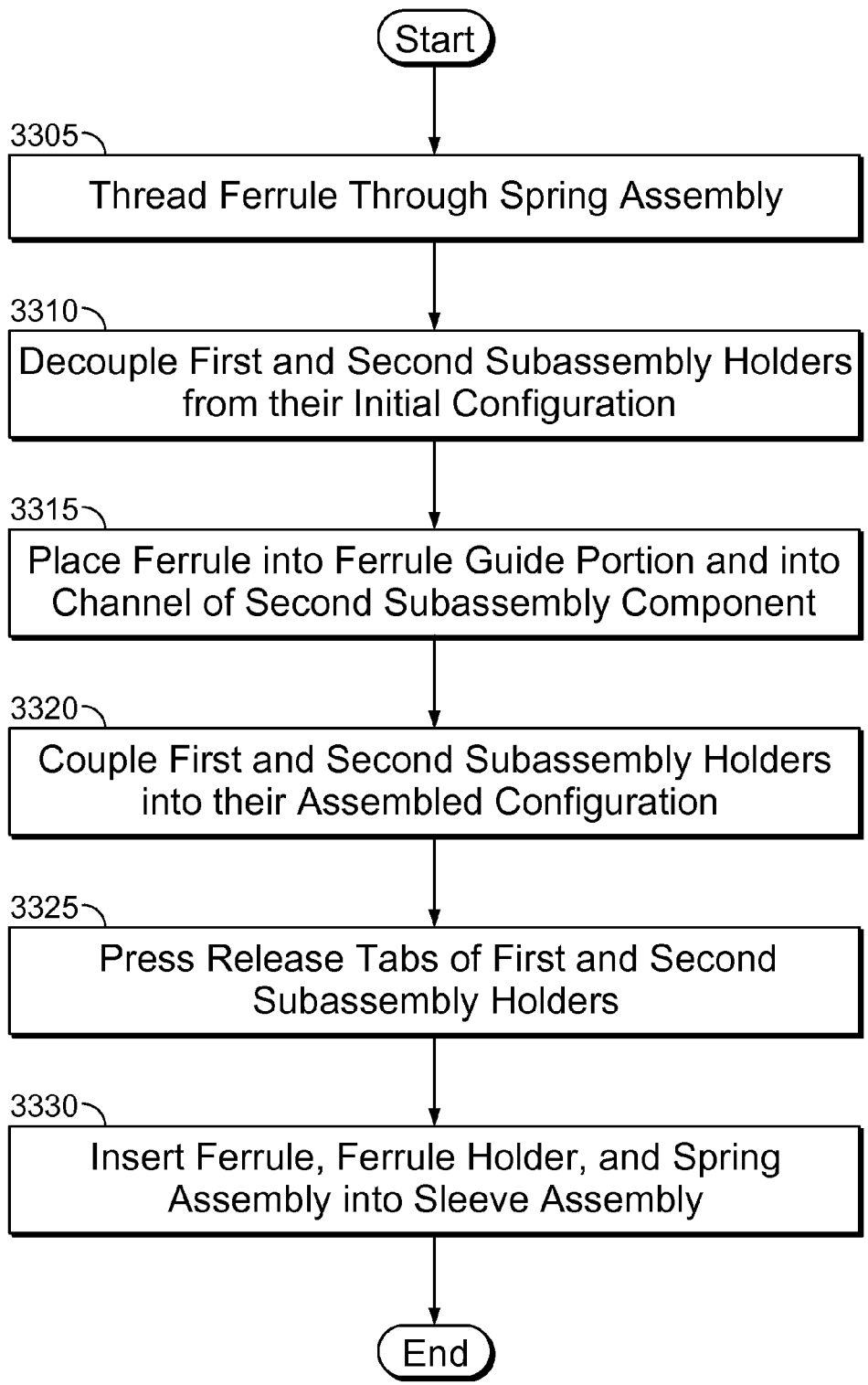
FIG. 33 illustrates a flowchart depicting an example of a method of assembling an optical connector in accordance with one or more aspects discussed herein.

FIG. 33 illustrates a flowchart depicting an example of a method of assembling an optical connector in accordance with one or more aspects discussed herein. The method may begin at step 3305 in which ferrule 309 coupled to optical fiber 102 may be threaded through spring assembly 308. For example, a tip end of the ferrule 309 may be inserted into tube 306 and may continue to be inserted through the spring holder 305 and the spring 304 until the ferrule has exited the spring 304. As a result, the optical fiber 102 may be threaded through the spring assembly 308 as shown in FIG. 3.

In step 3310, the first and second subassembly holders 1601, 2001 may be decoupled from their initial configuration. For example, as shown in FIGS. 26 and 27, the first and second subassembly holders 1601, 2001 may be placed in a kit in their initial configuration in which the first subassembly component 701 may be entirely disposed within recess 2503. Additionally, in such a configuration, the rim 2502 may be in contact with the top face of the first subassembly holder 1601. Additionally, in such a configuration, the guide rods 1602, 1603 may be disposed within their corresponding guide tubes 2002, 2003.

Using the tabs 2011, the first and second subassembly holder 1601, 2001 may be decoupled from one another by slidably moving the second subassembly component 2001 away from the first subassembly component 1601 along an axis defined by one or more of the guide rods 1602, 1603 and guide tubes 2002, 2003. In such an instance, the guide rods 1602, 1603 and guide tubes 2002, 2003 may be parallel to one another.

In step 3315, ferrule 309 may be placed within ferrule guide component 2007 and into channel 709 of the second subassembly component 702 as shown in FIG. 29. For example, in step 3315, the tip end of the ferrule 309 may be placed within the ferrule guide component 2007 of the second subassembly holder 2001. Additionally, the ferrule 309 may be placed within the channel 709 of the second subassembly component 702 such that one or more recesses 1001 of the ferrule 309 align with each of the ferrule notches 710 of the second subassembly component 702. Additionally, the optical fiber 102 may be disposed and/or otherwise coupled to the optical fiber holders 2008.

In step 3320, the first and second subassembly holders 1601, 2001 may be coupled to one another configuration. For example, in step 3320, the guide rods 1602, 1603 may be disposed within their corresponding guide tubes 2002, 2003 such that the first and second subassembly components 701, 702 respectively coupled to the first and second subassembly holders 1601, 2001 and the ferrule 309 are disposed between the first and second subassembly holders 1601, 2001 as shown in FIGS. 30 and 31. At this point, the ferrule notches 706 are aligned with one or more corresponding recesses 1001 of the ferrule 309. Additionally, the first and second subassembly components 701, 702 may be aligned to enable them to be coupled together. For example, the tabs 703 may align with recesses 708 and the tabs 707 may align with recesses 704.

Once the guide rods 1602, 1603 are disposed within their corresponding guide tubes 2002, 2003, the first subassembly holder 1601 may be moved towards the second subassembly holder 2001 until the first subassembly component 701 couples to the second subassembly component 702 forming ferrule holder 303. At this point, the ferrule holder 303 affixes the ferrule 309 in all degrees of freedom of motion (e.g., a fixed rotational orientation and longitudinal, i.e., lengthwise, position) relative to ferrule holder 303.

In step 3325, the release tabs 1606, 2010 may be depressed to decouple the ferrule holder 303 from the first and second subassembly holders 1601, 2001. For example, in step 3325, the release nob 2401 may be depressed to thereby move the release tab 1606 to its flexed configuration. As a result, the release tab 1606 may move the first subassembly component 701 of the ferrule holder 303 from being disposed between the tabs 1604 to decouple the ferrule holder 303 from the first subassembly holder 1601. Similarly, the release nob 2501 may be depressed to thereby move the release tab 2010 to its flexed configuration. As a result, the release tab 2010 may move the second subassembly component 702 of the ferrule holder 303 from being disposed between the tabs 2006 to decouple the ferrule holder 303 from the second subassembly holder 2001. The first and second subassembly holders 1601, 2001 may then be discarded.

In step 3330, the ferrule 309, ferrule holder 303, and spring assembly 308 may be inserted into the sleeve assembly 307. For example, in step 3330, the tip end of the ferrule 309 may extend a predetermined distance from the ferrule holder 303. The predetermined distance may be set by the placement of the ferrule guide component 2007 relative to the second subassembly component 702.

The ferrule holder 303, once assembled, has a first shape and the first portion 1402 of the channel 1401 has a complimentary shape and is sized such that ferrule holder 303 may only be inserted into the first portion 1402 in one (e.g., a single) orientation when the ferrule holder 303 is coupled to ferrule 309. For example, the shape may be an irregular pentagon, a non-equilateral triangle, or the like. For example, the ferrule holder 303 may be inserted (with the tip end of the ferrule 309 being inserted first) into the first portion 1402 of the channel 1401 of the locking unit 302 in only a single orientation relative to the locking unit 302. For example, the locking unit 302 may prevent and/or otherwise block the ferrule holder 303 from being inserted into the first portion 1402 of its channel 1401 unless the ferrule holder 303 is inserted in the single orientation. Once inserted, the locking unit 302 prevents rotational movement of the ferrule holder 303.

The spring 304 threaded onto the optical fiber 102 may be inserted into the first portion 1402 of the channel 1401 of the locking unit 302. Additionally, the first end 406 of the spring holder 305 may be inserted into the first portion 1402 of the channel 1401 of the locking unit 302 until the rim 408 abuts an end of the locking portion 1203 of the locking unit 302. The retaining tabs 407 of the spring holder 305 may engage a rim of the apertures 1204 to maintain a fixed position of the spring holder 305 relative to the locking unit 302.

At this point, the spring 304 may have moved the ferrule holder 303 along an elongate axis of the lock unit 302 until the ferrule holder 303 abutted a surface of the middle portion 1502 of the channel 1401, which prevents the ferrule holder 303 from being inserted any farther into the locking unit 302. A width of the middle portion 1502 may be greater than a width of the tip of the ferrule 309 thereby allowing the tip of the ferrule 309 to extend through the middle portion 1502 to the second portion 1501 of the channel 1401 of the lock unit 302. The spring 304 may be under compressive stress that is maintained by an end of the spring 304 contacting the ferrule holder 303 and an end of the spring 304 contacting the spring holder 305 locked in a fixed position relative to the locking unit 302. As a result, the spring 304 may be partially compressed in the final assembly. Spring 304 may serve to absorb pressure applied to the tip of the ferrule 309 when connecting the optical connector 101 to another optical connector.

Accordingly, the ferrule 309 and, thus, the optical fiber 102 are affixed in a rotational degree of freedom (e.g., a fixed rotational orientation) relative to the optical connector 101. The fixed orientation relationship between the ferrule 309 or optical fiber 102 and the optical connector 101 may be known and predetermined. Once the optical connector 101 is assembled, all of the channels of each of the components may be co-axial.

Assembly of the optical connector 101 may be easily performed in the field without the need for any tools. In this example, each component may simply snap together using only a technician's bare hands. Also, because most if not all of the components may be manufactured using a molding process, a relatively high consistency in product quality may be easily achieved. Moreover, the molding of such parts may allow for inexpensive large-scale manufacturing, thereby resulting in low unit cost. In addition, in all of the illustrative field-assembled optical connectors described herein, no index-matching gel is needed, and thus the optical connection as a whole may ultimately be more reliable. This is because the ferrule assembly may already come from the manufacturer pre-attached to the optical fiber. After running the pre-ferruled optical fiber as desired (e.g., blowing the pre-ferruled optical fiber through a conduit), the technician in the field may need merely to assembly the optical connector in the field so as to hold the ferrule assembly. In some embodiments, ferrule connectors may be affixed to both ends of an optical fiber.

In practice, sleeve assembly 307 and spring assembly 308 may already be preassembled by the time it reaches the end user. Thus, the end user may need only to thread the ferrule 309 couple to the optical fiber 102 through the spring assembly 308, affix the ferrule 309 to the ferrule holder 303 using the first and second subassembly holders 1601, 2001, and insert the ferrule holder 303 and spring assembly 308 into the sleeve assembly 307 until the tabs 407 engage the apertures 1204 of the lock unit 302 to form optical connector 101. As a result, the ferrule 309 and optical fiber 102 may have a fixed rotational alignment with respect to the optical connector 101. In such a case, a kit may be sold or otherwise provided that includes one or more of the following components: the connector cover 301, the lock unit 302, the first and second subassembly components 701, 702 respectively coupled to the first and second subassembly holders 1601, 2001, the spring 304, the spring holder 305, the tube 306, the ferrule 309 coupled to optical fiber 102. In some embodiments, the kit may include the preassembled sleeve assembly 307, the preassembled spring assembly 308, and the first and second subassembly holders 1601, 2001 in their initial configuration and respectively coupled to the first and second subassembly components 701, 702. The kit may also include written instructions for assembling connector 101 from the included components.

Thus, illustrative embodiments of a connector have been described that are practical for assembly in the field, such as by the end user. Because two connectors (e.g., connectors 101, 103) may be mated together as shown in FIG. 2 without the need of any type of splice, the described connector may be easier, faster, and cheaper to assemble than creating a conventional fusion splice, and/or more reliable than a conventional mechanical splice. Although the embodiments shown in the drawings are illustratively directed to a SC-P type optical connector that optically connects to another SC-P type optical connector such as connector 103, aspects of the invention as described herein apply to other types of optical connectors, with minor modifications for doing so being readily apparent to one of ordinary skill in the relevant art after having the benefit of reading the present disclosure.

Although specific examples of carrying out the disclosure have been described, those skilled in the art will appreciate that are numerous variations and permutations of the above-described apparatuses and methods that are contained within the spirit and scope of the disclosure as set forth in the appending claims. Additionally, numerous other embodiments, modifications, variations within the scope and spirit of the appended claims may occur to persons of ordinary skill in the art from a review of this disclosure. Specifically, one or more of the features described herein may be combined with any or all of the other features described herein. The various features described above are merely non-limiting examples, and may be arranged, combined, subdivided, omitted, and/or altered in any desired manner.

What is claimed is:

1. A kit comprising:
   a first ferrule holder subassembly having a first elongate body defining a first open-faced channel sized to receive an optical fiber ferrule;
   a first assembly jig includes a first set of one or more pairs of opposing tabs configured to maintain the first ferrule holder subassembly at a first fixed position in the first assembly jig prior to attachment of the first ferrule holder subassembly to a second ferrule holder subassembly;
   the second ferrule holder subassembly is attachable to the first ferrule holder subassembly and has a second elongate body defining a second open-faced channel sized to receive the optical fiber ferrule; and
   a second assembly jig includes a second set of one or more pairs of opposing tabs configured to maintain the second ferrule holder subassembly at a second fixed position in the second assembly jig prior to attachment of the second ferrule holder subassembly to the first ferrule holder subassembly.

2. The kit of claim 1,
   wherein the first assembly jig defines a C-shaped aperture in between the first set of one or more pairs of opposing tabs to define a flexible release tab configured to decouple the first ferrule holder subassembly from the first assembly jig.

3. The kit of claim 2,
   wherein the flexible release tab includes a portion protruding from a bottom face of the first assembly jig; and
   wherein an outer rim of the first assembly jig defines a recess having a depth greater than a length of the portion.

4. The kit of claim 1,
   wherein the first assembly jig includes a plurality of geometrically dissimilar guide rods; and
   wherein the second assembly jig includes a plurality of complimentary features configured to mate with the plurality of geometrically dissimilar guide rods.

5. The kit of claim 4, wherein a width of one guide rod of the plurality of geometrically dissimilar guide rods is greater than a width of another guide rod of the plurality of geometrically dissimilar guide rods.

6. The kit of claim 4, wherein each of the plurality of geometrically dissimilar guide rods are parallel to one another.

7. The kit of claim 6, wherein the plurality of complimentary features are a plurality of guide tubes configured to receive the plurality of geometrically dissimilar guide rods at either end of the plurality of guide tubes.

8. The kit of claim 7, wherein a geometrically dissimilar guide rod of the plurality of geometrically dissimilar guide rods has a width greater than a width of a channel defined by a guide tube of the plurality of guide tubes such that the geometrically dissimilar guide rod is not disposable within the channel.

9. The kit of claim 8, wherein a tab of the first ferrule holder subassembly is configured to align with a recess of the second ferrule holder subassembly when the plurality of geometrically dissimilar guide rods are disposed within the plurality of guide tubes and the first ferrule holder subassembly and the second ferrule holder subassembly are disposed between the first assembly jig and the second assembly jig.

10. The kit of claim 1, wherein an outer rim of the second assembly jig defines a recess having a depth greater than a height of the first ferrule holder subassembly.

11. The kit of claim 10, wherein the outer rim of the second assembly jig contacts a top face of the first assembly jig when in a storage configuration such that the first ferrule holder subassembly is disposed within the recess defined by the outer rim.

12. The kit of claim 1, wherein the second assembly jig includes a C-shaped ferrule guide portion positioned to receive a tip of the optical fiber ferrule when the optical fiber ferrule is received in the second open-faced channel.

13. The kit of claim 12, wherein an open side of the C-shaped ferrule guide portion aligns with an elongate axis defined by the second open-faced channel of the second ferrule holder subassembly.

14. The kit of claim 1, wherein the first ferrule holder subassembly includes a first set of one or more ferrule retaining ridges disposed within the first open-faced channel.

15. The kit of claim 14,
    wherein the second ferrule holder subassembly includes a second set of one or more ferrule retaining ridges disposed within the second open-faced channel,
    wherein the first set of one or more ferrule retaining ridges are arranged differently than the second set of one or more ferrule retaining ridges when the first ferrule holder subassembly is affixed to the second ferrule holder subassembly.

16. The kit of claim 15, wherein the first set of one or more ferrule retaining ridges and the second set of one or more ferrule retaining ridges are configured to align with a corresponding plurality of recesses defined by the optical fiber ferrule to couple the optical fiber ferrule to the first ferrule holder subassembly and the second ferrule holder subassembly in a fixed rotational orientation relative to the first ferrule holder subassembly and the second ferrule holder subassembly.

17. A kit comprising:
    a first ferrule holder subassembly having a first elongate body defining a first open-faced channel sized to receive an optical fiber ferrule, wherein the first ferrule holder subassembly includes a first set of one or more tabs and defines a first set of one or more recesses configured to receive a second set of one or more tabs of a second ferrule holder subassembly, wherein the first ferrule holder subassembly includes a first set of ferrule retaining ridges disposed within the first open-faced channel;
    a first assembly jig affixed to the first ferrule holder subassembly, the first assembly jig including a first set of one or more pairs of opposing tabs configured to maintain the first ferrule holder subassembly at a first fixed position relative to the first assembly jig, wherein the first assembly jig defines a C-shaped aperture between the first set of one or more pairs of opposing tabs to define a first flexible release tab movable to decouple the first ferrule holder subassembly from the first assembly jig, wherein the first assembly jig includes a plurality of parallel guide rods having different widths;
    the second ferrule holder subassembly having a second elongate body defining a second open-faced channel sized to receive the optical fiber ferrule, wherein the second ferrule holder subassembly includes the second set of one or more tabs and defines a second set of one or more recesses configured to receive the first set of one or more tabs, wherein the second ferrule holder subassembly includes a second set of ferrule retaining ridges disposed with the second open-faced channel; and
    a second assembly jig affixed to the second ferrule holder subassembly, the second assembly jig including a second set of one or more pairs of opposing tabs configured to maintain the second ferrule holder subassembly at a second fixed position relative to the second assembly jig, wherein the second assembly jig defines a C-shaped aperture between the second set of one or more pairs of opposing tabs to define a second flexible release tab movable to decouple the second ferrule holder subassembly from the second assembly jig, wherein the second assembly jig includes a plurality of guide tubes sized to receive the plurality of parallel guide rods in either end of the plurality of guide tubes, wherein the second assembly jig includes a C-shaped ferrule guide portion configured to receive a tip of the optical fiber ferrule when the optical fiber ferrule is received in the second open-faced channel, wherein one guide rod of the plurality of parallel guide rods has a width greater than a width of a channel defined by one guide tube of the plurality of guide tubes, wherein the first set of one or more tabs is configured to align with the second set of one or more recesses and the second set of one or more tabs is configured to align with the first set of one or more recesses when the plurality of parallel guide rods is disposed within the plurality of guide tubes and the first ferrule holder subassembly and the second ferrule holder subassembly are disposed between the first assembly jig and the second assembly jig, and wherein the first ferrule holder subassembly is disposed within a recess defined by an outer rim of the second assembly jig when the outer rim contacts a top face of the first assembly jig.

18. A method comprising:

maintaining a first ferrule holder subassembly in a fixed position relative to a first assembly jig and a second ferrule holder subassembly in a fixed position relative to a second assembly jig when the first assembly jig is decoupled from the second assembly jig;

disposing a tip end of a ferrule coupled to an optical fiber within a ferrule guide portion of the first assembly jig;

disposing one side of a different portion of the ferrule within an open channel of the first ferrule holder subassembly coupled to the first assembly jig;

coupling the first assembly jig to the second assembly jig; and moving the first assembly jig towards the second assembly jig until the first ferrule holder subassembly and the second ferrule holder subassembly snap together about the ferrule.

19. The method of claim 18, further comprising:

decoupling the first assembly jig from the second assembly jig slidably coupled to the first assembly jig in a stored configuration, and wherein the moving the first assembly jig towards the second assembly jig disposes another side of the different portion of the ferrule within an open channel of the second ferrule holder subassembly.

20. The method of claim 19, wherein the moving the first assembly jig towards the second assembly jig couples the first ferrule holder subassembly to the second ferrule holder subassembly such that a rotational position and a longitudinal position of the ferrule is fixed with respect to the first ferrule holder subassembly and the second ferrule holder subassembly.

* * * * *